US008750103B2

(12) United States Patent
Baduge et al.

(10) Patent No.: US 8,750,103 B2
(45) Date of Patent: Jun. 10, 2014

(54) APPLICATION LAYER MULTICAST (ALM) TREE CONSTRUCTING APPARATUS, ALM TREE CONSTRUCTING METHOD, PROGRAM, AND INTEGRATED CIRCUIT

(75) Inventors: Thilmee Baduge, Osaka (JP); Eiichi Muramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 559 days.

(21) Appl. No.: 13/057,316

(22) PCT Filed: Jun. 8, 2010

(86) PCT No.: PCT/JP2010/003813
§ 371 (c)(1),
(2), (4) Date: Feb. 3, 2011

(87) PCT Pub. No.: WO2010/146798
PCT Pub. Date: Dec. 23, 2010

(65) Prior Publication Data
US 2011/0128958 A1    Jun. 2, 2011

(30) Foreign Application Priority Data
Jun. 15, 2009    (JP) ................. 2009-142514

(51) Int. Cl.
*H04J 1/16*    (2006.01)
(52) U.S. Cl.
USPC ........................................ 370/229; 370/256
(58) Field of Classification Search
USPC ......... 370/229, 231, 232, 252, 254, 256, 260, 370/389, 390, 498, 468
See application file for complete search history.

(56) References Cited

U.S. PATENT DOCUMENTS 8,520,556 B2 *    8/2013    Karuppiah et al. ........... 370/256
(Continued)

FOREIGN PATENT DOCUMENTS

| CN | 101083544 | 12/2007 |
|---|---|---|
| CN | 101340301 | 1/2009 |
| EP | 2 146 460 | 1/2010 |

OTHER PUBLICATIONS

International Search Report issued Sep. 14, 2010 in International (PCT) Application No. PCT/JP2010/003813.
Ueki et al., "Robust Tree Construction for User Withdrawal in Application-level Multicast" IEICE Technical Report, vol. 105, No. 86, May 19, 2005, pp. 1-4.

(Continued)

*Primary Examiner* — Hassan Phillips
*Assistant Examiner* — Ajay Cattungal
(74) *Attorney, Agent, or Firm* — Wenderoth, Lind & Ponack, L.L.P.

(57) ABSTRACT

The ALM tree constructing apparatus includes a metric measuring unit for measuring an upload link bandwidth for each of terminals; and a node allocating unit allocating, to each of the terminals, at least one of (i) an upper terminal and (ii) one or more lower terminals. A first branch allocating unit allocates at least a part of the upload link bandwidth which is assigned to each of the terminals that has the lower terminal allocated, so that the part of upload link bandwidth acts as a logical first branch for distributing the data stream; and a second branch allocating unit allocates a remaining bandwidth, unused as the logical first branch, to a terminal provided in a hierarchy level below the terminal having the remaining bandwidth, so that the remaining bandwidth acts as a logical second branch for distributing reference data regarding the data stream.

12 Claims, 15 Drawing Sheets

(56) References Cited

U.S. PATENT DOCUMENTS

| | | | |
|---|---|---|---|
| 2002/0122422 A1* | 9/2002 | Kenney et al. | 370/392 |
| 2004/0236863 A1* | 11/2004 | Shen et al. | 709/231 |
| 2006/0007947 A1* | 1/2006 | Li et al. | 370/432 |
| 2007/0116050 A1* | 5/2007 | Hibino et al. | 370/468 |
| 2009/0172164 A1* | 7/2009 | Tanaka et al. | 709/226 |
| 2010/0221006 A1* | 9/2010 | Yoon et al. | 398/58 |

OTHER PUBLICATIONS

Nakai et al., "Graph Construction for Application Level Multicast Using Network Coding" IEICE Technical Report, vol. 107, No. 525, Feb. 28, 2008, pp. 7-12.

Shi et al., "Multicast Routing and Bandwidth Dimensioning in Overlay Networks" IEEE Journal on Selected Areas in Communications, vol. 20, No. 8, Oct. 2002, pp. 1444-1455.

* cited by examiner

APPLICATION LAYER MULTICAST (ALM) TREE CONSTRUCTING APPARATUS, ALM TREE CONSTRUCTING METHOD, PROGRAM, AND INTEGRATED CIRCUIT

BACKGROUND OF INVENTION

1. Technical Field

The present invention relates to an ALM tree constructing apparatus effectively utilizing, when a stream is distributed via the ALM tree, a remaining bandwidth found after the construction of the ALM tree, and an ALM tree constructing method.

2. Background Art

One of typical stream distribution techniques utilizes an ALM tree. FIGS. 12 and 13 outline such an ALM tree. As shown in FIG. 12, terminals 11, 12, 13, 14, 15, 16 and 17 are connected to a star communication network 10, such as the Internet and a Local Area Network (LAN).

Here consider, for example, the case where the terminal 11 tries to distribute a data stream directly to all the other terminals 12 to 17; this causes the data stream amount to exceed the upper limit of the bandwidth of a line connected to the terminal 11, resulting in delay in the data stream distribution.

Thus as shown in FIG. 13, a logically hierarchical structure is constructed to have the terminal 11; namely the distribution source of the data stream, allocated as the topmost node (root node). In other words, the terminal 11 distributes the received data stream only to the terminals 12 and 13. Each of the terminals 12 and 13 reproduces the data stream received from the terminal 11 as well as distributes the data stream to the terminals 14 and 15, and 16 and 17 which are lower in the level. The above construction makes possible dispersing the traffic, which contributes to delay-free stream distribution.

Here, when video is distributed via the ALM tree on the Internet, the following major indicators are used to evaluate the quality of the video to be distributed: (i) the resolution of the video to be distributed (the bit rate of the distributed video) and (ii) the degree of delay developed when the video is distributed from the distribution source (hereinafter referred to as "source") to each receiver (For an interactive application such as a distance lecture, for example, both of a higher resolution and a shorter delay are important).

Since two or more user terminals (hereinafter simply referred to as "terminals" or "nodes") form an ALM tree, the construction of the ALM tree is significantly affected by (i) the upper limit and the lower limit of bandwidths for an upload link and a download link of a node, and (ii) a delay time between the terminals.

In a typical internet use (receiving content), more data is uploaded than downloaded. Thus most of upper limits of bandwidths for download links (hereinafter referred to as "downlink") are set higher than those for upload links (hereinafter referred to as "uplink").

For example, the Asymmetric Digital Subscriber Line (ADSL) subscribed by a lot of users has uplink a bandwidth as small as just over 10% of its downlink bandwidth. Accordingly, the construction of the ALM tree depends on the upper limit of the uplink bandwidth of a node and the delay between the nodes.

A lot of techniques have been proposed to construct various ALM trees taking the two metrics into consideration. For example, Non Patent Literature 1 offers an algorithm for constructing an ALM tree: when an uplink bandwidth of a node and a delay between nodes are provided as an input, (i) the maximum delay of the ALM tree does not exceed the given upper limit, and (ii) the bandwidth of the ALM tree available for the distribution is the greatest.

CITATION LIST

Non Patent Literature

[NPL 1]
Shi, S. Y. and Turner, J. S. 2002. "Multicast routing and bandwidth dimensioning in overlay networks." IEEE Journal on Selected Areas in Communications. vol. 20, no. 8 (October), pp. 1444-1455.

SUMMARY OF INVENTION

Technical Problem

Such an algorithm makes the best use of an uplink bandwidth for each node in order to distribute high-quality video. The use of this algorithm, however, restricts branch widths within the minimum uplink bandwidth of non-leaf nodes forming an ALM tree. In other word, the algorithm has a disadvantage in that the bandwidth of video to be distributed is restricted to the minimum uplink bandwidth. More specifically, some bandwidths for nodes would not be used for distributing a data stream.

The present invention is conceived in view of the above problem and has as an object to introduce an ALM tree constructing apparatus which effectively utilizes a remaining bandwidth found on an ALM tree to make high-quality transmission available.

An Application Layer Multicast (ALM) tree constructing apparatus according to an aspect of the present invention constructs an ALM tree for distributing a data stream from a root terminal, which is selected from among terminals, to all the other terminals. Here the terminals are mutually connected via a communication network. Specifically, the ALM tree constructing apparatus includes: a metric measuring unit which measures an upload link bandwidth for each of the terminals; a terminal allocating unit which allocates, to each of the terminals, at least one of (i) an upper terminal acting as a distribution source of the data stream and (ii) one or more lower terminals acting as destinations of the data stream; a first communication path allocating unit which allocates at least a part of the upload link bandwidth which is (i) assigned to each of the terminals that has the lower terminal allocated, and (ii) measured by the metric measuring unit, so that the part of upload link bandwidth acts as a logical first communication path for distributing the data stream to the lower terminal; and for each of terminals having a remaining bandwidth which is included in the upload link bandwidth and is unused as the logical first communication path, a second communication path allocating unit which allocates the remaining bandwidth to a terminal provided in a hierarchy level below the terminal having the remaining bandwidth, so that the remaining bandwidth acts as a logical second communication path for distributing reference data regarding the data stream.

The above structure employs an unused remaining bandwidth as the first communication path to distribute the reference data. Accordingly, the constructed ALM tree can effectively utilize the upload link bandwidths.

The terminal allocating unit may allocate each of the terminals to one of a first level, a second level, and a third level, the terminals allocated to the second level having one of the terminals allocated to the first level as the upper terminal, and the terminals allocated to the third level having one of the terminals allocated to the second level as the upper terminal. The second branch allocating unit may equally allocate, as the second communication path, (i) a remaining bandwidth of each of terminals in the second hierarchy to each of terminals in the third hierarchy, and (ii) a remaining bandwidth of each of terminals in the first hierarchy to each of the terminals in the second hierarchy.

In the case where a first quotient when the remaining bandwidth of the terminal in the first hierarchy is divided by the number of the terminals in the second hierarchy is greater than a second quotient when the remaining bandwidth of the terminal in the second hierarchy is divided by the number of the terminals in the third hierarchy, the second communication path allocating unit may allocate the remaining bandwidth of the terminal in the first hierarchy among the terminals in the second hierarchy and the third hierarchy, so that the second communication paths provided to the terminals in the second hierarchy and the third hierarchy share a same bandwidth.

In a data stream distribution which requires sufficient real-time capability, a large bandwidth allocated just among some of communication paths cannot work effectively. The above structure allows a remaining bandwidth of each level to be allocated to all the terminals which belong to a level below the level where the remaining bandwidth is provided. This contributes to a more effective use of the remaining bandwidth.

The ALM tree constructing apparatus may further include: a transmission path delay measuring unit which measures, for each of all the other terminals, a delay time observed until each other terminal receives the data stream distributed from the root terminal; and a transmission path delay applying unit which allocates, based on a measurement result obtained from the transmission path delay measuring unit, each of the terminals to one of a first level, a second level, and a third level each receiving the data stream distributed from the root terminal, the first level receiving the data stream on or before a first time, the second level receiving the data stream after the first time and on or before a second time coming after the first time, and the third level receiving the data stream after the second time. The second communication path allocating unit may equally allocate, as the logical second communication path, (i) a remaining bandwidth of each of terminals in the second level to each of terminals in the third level, and (ii) a remaining bandwidth of each of terminals in the first level to each of the terminals in the second level.

In general, a delay time of each terminal varies depending on a level in the ALM tree. In reality, however, the delay time significantly varies depending on the traffic of the communication network and the performance of a terminal. The above structure makes possible determining a level based on an actual delay time, not on the level in the ALM distribution, and allocating the second communication paths based on the actual-delay-time-based level. This contributes to a more effective use of the remaining bandwidth.

The ALM tree constructing apparatus may further include a reference data allocating unit which, when the remaining bandwidth of each of two or more of the terminals is allocated to a single terminal included in the terminals so that the remaining bandwidth acts as the logical second communication path, proportionally divides the reference data by the bandwidth of the logical second communication path, and which causes each of the two or more of the terminals to deliver the divided reference data. The above structure contributes to a delay-free distribution of the reference data to a terminal which receives the reference data from two or more terminals.

For example, the reference data may include an error-correcting code for the data stream. As another example, the reference data may include retransmission data for compensating a loss of the data stream. It is noted that the reference data shall not be limited to the error-correcting code or the retransmission data. For example, the reference data may be the data stream itself.

The ALM tree constructing apparatus may be the root terminal. The ALM tree constructing apparatus may be either another terminal included in the ALM tree or a terminal other than the terminals included in the ALM tree.

A method for constructing an ALM tree according to another aspect of the present invention distributes a data stream from a root terminal, which is selected from among terminals, to all the other terminals. Here the terminals are mutually connected via a communication network. The method includes: measuring an upload link bandwidth for each of the terminals; allocating, to each of the terminal, at least one of (i) an upper terminal acting as a distribution source of the data stream and (ii) one or more lower terminals acting as destinations of the data stream; allocating at least a part of the upload link bandwidth which is (i) assigned to each of the terminals that has the lower terminal allocated, and (ii) measured in the measuring, so that the part of upload link bandwidth acts as a logical first communication path for distributing the data stream to the lower terminal; and, for each of terminals having a remaining bandwidth which is included in the upload link bandwidth and is unused as the first communication path, allocating the remaining bandwidth to a terminal provided in a hierarchy level below the terminal having the remaining bandwidth, so that the remaining bandwidth acts as a logical second communication path for delivering reference data regarding the data stream.

A non-transitory computer-readable recording medium according to another aspect of the present invention is used in a computer. Here the recording medium has a computer program (i) used for constructing an ALM tree which distributes a data stream from a root terminal, which is selected from among terminals, to all the other terminals, the terminals being mutually connected via a communication network, and (ii) recorded thereon for causing the computer to execute: measuring an upload link bandwidth for each of the terminals; allocating, to each of the terminal, at least one of (i) an upper terminal acting as a distribution source of the data stream and (ii) one or more lower terminals acting as destinations of the data stream; allocating at least a part of the upload link bandwidth which is (i) assigned to each of the terminals that has the lower terminal allocated, and (ii) measured in the measuring, so that the part of upload link bandwidth acts as a logical first communication path for distributing the data stream to the lower terminal; and, for each of terminals having a remaining bandwidth which is included in the upload link bandwidth and is unused as the first communication path, allocating the remaining bandwidth to a terminal provided in a hierarchy level below the terminal having the remaining bandwidth, so that the remaining bandwidth acts as a logical second communication path for delivering reference data regarding the data stream.

An integrated circuit according to another aspect of the present invention constructs an ALM tree which distributes a data stream from a root terminal, which is selected from among terminals, to all the other terminals. Here the terminals are mutually connected via a communication network. Specifically, the integrated circuit includes: a metric measuring unit which measures an upload link bandwidth for each of the terminals; a terminal allocating unit which allocates to each of the terminal at least one of (i) an upper terminal and (ii) one or more lower terminals, the upper terminal acting as a distribution source of the data stream, and the lower terminals acting as a destination of the data stream; a first communication path allocating unit which allocates at least a part of the upload link bandwidth which is (i) assigned to each of the terminals that has the lower terminal allocated, and (ii) measured by the metric measuring unit, so that the part of upload link bandwidth acts as a logical first communication path for distributing the data stream to the lower terminal; and, for each of terminals having a remaining bandwidth which is included in the upload link bandwidth and is unused as the first communication path, a second branch allocating unit which allocates the remaining bandwidth to a terminal provided in a hierarchy below the terminal having the remaining bandwidth, so that the remaining bandwidth acts as a logical second communication path for delivering reference data regarding the data stream.

It is noted that, instead of the ALM tree constructing apparatus and the ALM tree constructing method, the present invention may be introduced as an integrated circuit which exercises functions thereof, and a program product which, when loaded into a computer, causes the computer to execute the functions. As a matter of course, such a program product may be distributed via storage media including a compact disc read only memory (CD-ROM), and transmission media including the Internet.

The present invention can efficiently utilize a remaining bandwidth of the ALM tree in a redundant code and replicated data, which contributes to higher quality of a data stream to be distributed.

DETAILED DESCRIPTION OF INVENTION

Hereinafter, Embodiments of the present invention shall be detailed with reference to the drawings.

Embodiment 1

Figure 1A:
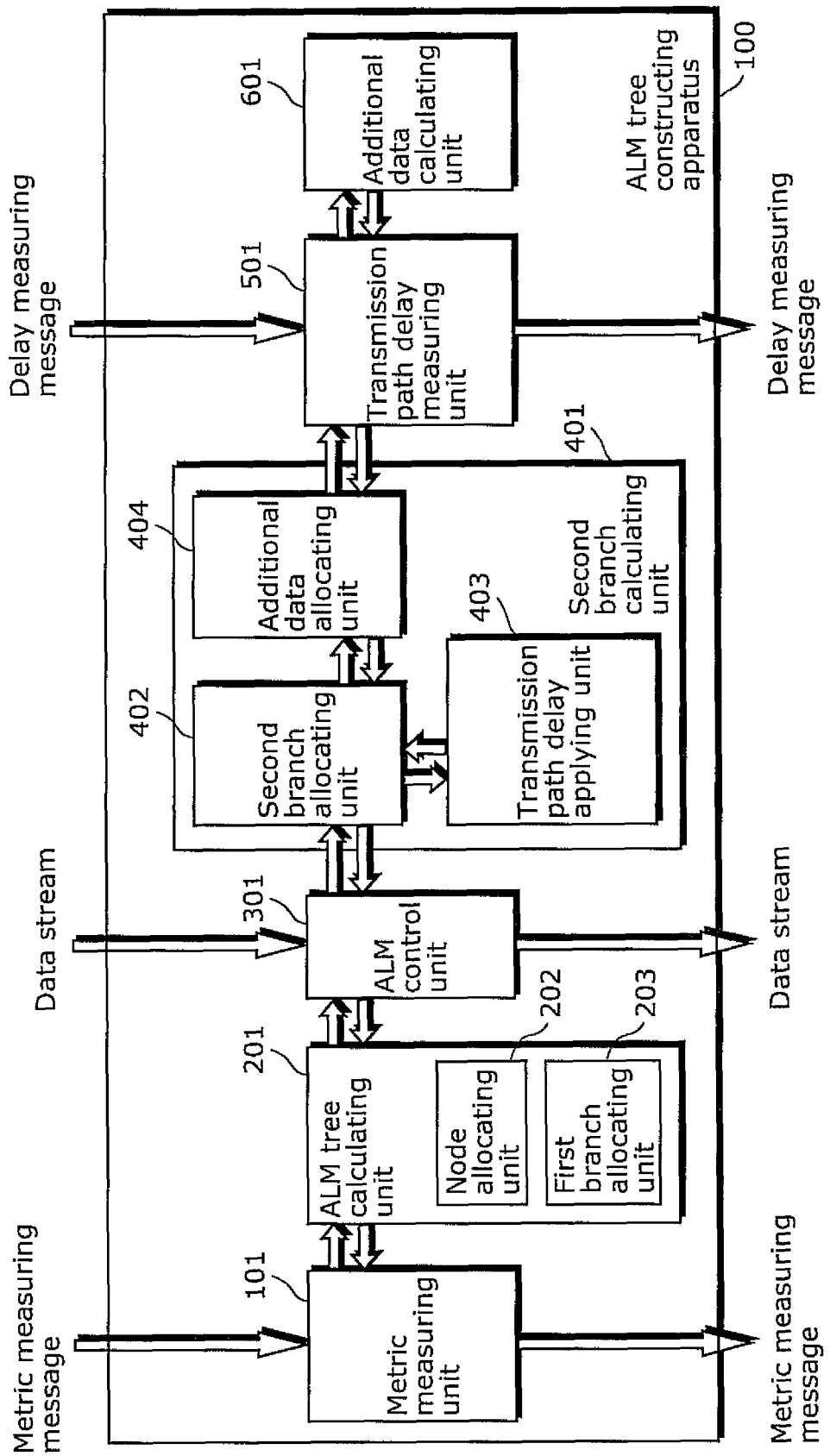
FIG. 1A is a block diagram showing an ALM tree constructing apparatus according to Embodiments 1 and 2 in the present invention.

FIG. 1A is a block diagram typically exemplifying an ALM tree constructing apparatus 100 according to Embodiment 1 in the present invention. The ALM tree constructing apparatus 100 shown in FIG. 1A mostly includes a metric measuring unit 101, an ALM tree calculating unit 201, an ALM control unit 301, a second branch calculating unit 401, a transmission path delay measuring unit 501, and an additional data calculating unit 601.

The metric measuring unit 101 measures an upload link bandwidth for each node in an ALM tree. It is noted that included as a measuring object may be another metric required for constructing the ALM tree, such as the delay between nodes.

Based on the measurement result obtained from the metric measuring unit 101, the ALM tree calculating unit 201 calculates construction of the ALM tree. Specifically, the ALM tree calculating unit 201 includes a node allocating unit 202 and a first branch allocating unit 203.

First, the node allocating unit (terminal allocating unit) 202 allocates each of terminals to any one of levels. Next, the node allocating unit 202 allocates to each terminal at least one of an upper terminal and a lower terminal. The upper terminal acts as a distribution source of a data stream. Only one terminal is selected as the upper terminal from among terminals in a level directly above. Concurrently, the lower terminal acts as a destination of the data stream. One or more terminals are selected as the lower terminals from among terminals in a level directly below.

The first branch allocating unit (first communication path allocating unit) 203 allocates at least a part of the upload bandwidth which is (i) assigned to each of the terminals that has the lower terminal allocated, and (ii) measured by the metric measuring unit 101, so that the part of upload bandwidth acts as a logical first communication path (hereinafter referred to as "first branch") for distributing the data stream to the lower terminal.

Based on ALM tree constructing data, the ALM control unit 301 receives, duplicates, and transmits a data stream to be distributed. It is noted that when a terminal not included in the ALM tree works as the ALM tree constructing apparatus 100, the ALM control unit 301 may be omitted.

The second branch calculating unit 401 calculates a remaining bandwidth of each node in the ALM tree, and allocates the calculated remaining bandwidth to a downstream node in the ALM tree so that the calculated remaining bandwidth works as a second communication path (hereinafter referred to as "second branch"). Specifically, the second branch calculating unit 401 includes a second branch allocating unit 402, a transmission path delay applying unit 403, and an additional data allocating unit 404.

For each of the terminals with a remaining bandwidth which is included in the upload bandwidth and is unused as the first branch, the second branch allocating unit (second communication path allocating unit) 402 allocates the remaining bandwidth to a terminal provided in a level below the terminal with the remaining bandwidth. It is noted that the "second branch" is a logical communication path for distributing additional data (also referred to as "reference data") regarding the data stream.

The transmission path delay applying unit 403 applies the delay time of the data stream to the calculation of the second branch. For each node in the ALM tree, the transmission path delay measuring unit 501 measures a delay time observed until the data stream distributed from the source is received. It is noted that the transmission path delay applying unit 403 and the transmission path delay measuring unit 501 may be omitted in Embodiment 1. Detailed operations of the units shall be described in Embodiment 2.

The additional data allocating unit (reference data allocating unit) 404 allocates additional data to be transmitted to each second branch. The additional data calculating unit 601 calculates additional data to be transmitted on the ALM tree.

Figure 1B:
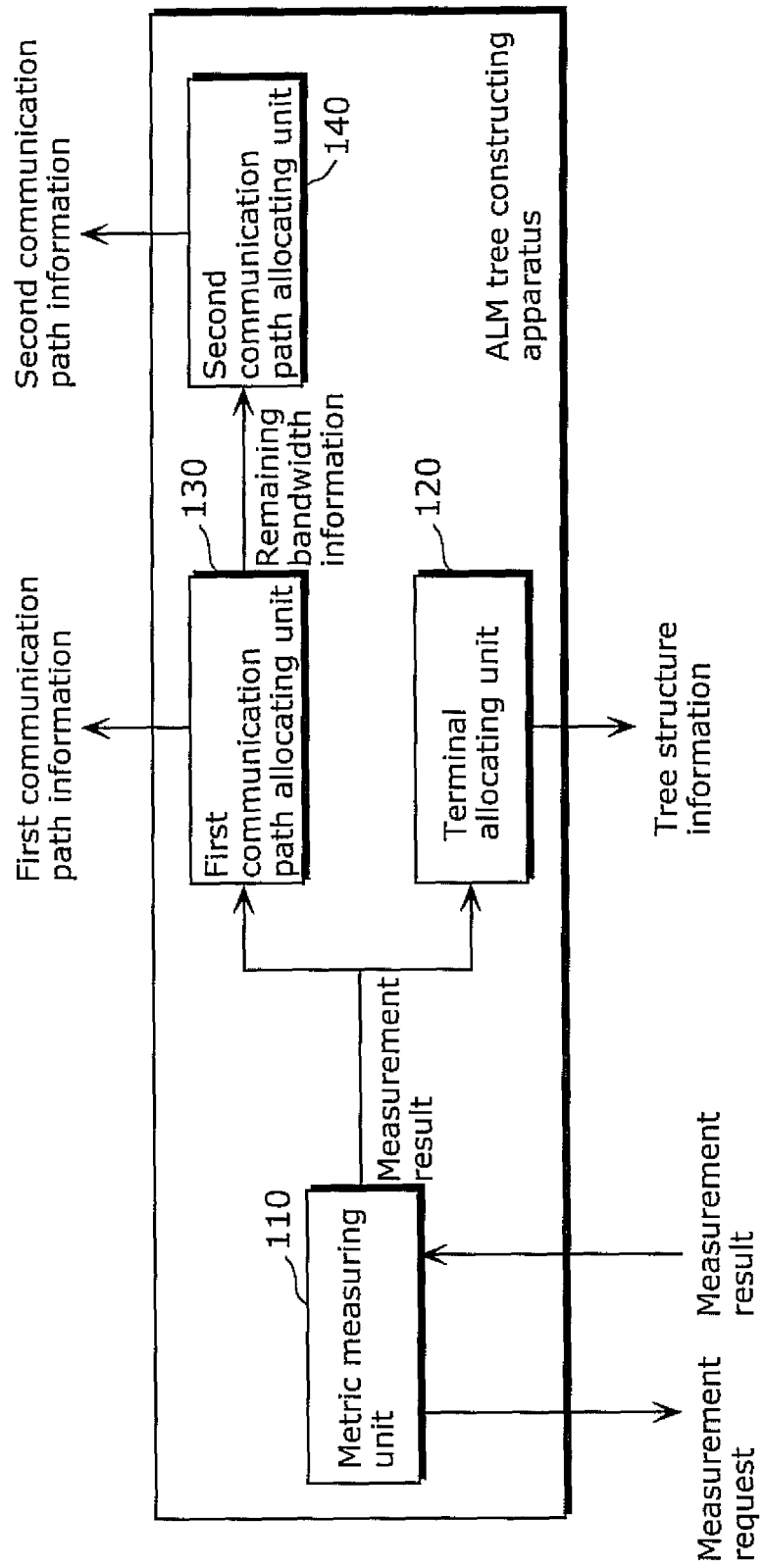
FIG. 1B is a block diagram showing a minimum configuration of the ALM tree constructing apparatus according to Embodiment 1 in the present invention.
Figure 1C:
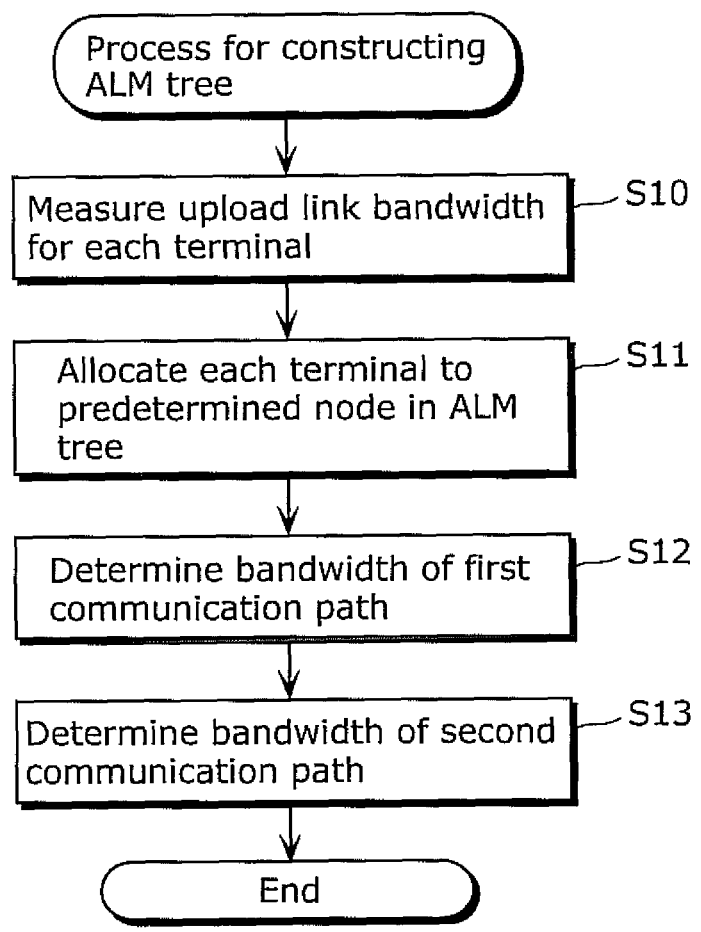
FIG. 1C is a flowchart showing an operation of the ALM tree constructing apparatus in FIG. 1B.

FIG. 1B shows a minimum configuration of the ALM tree constructing apparatus 100 according to Embodiment 1 in the present invention. FIG. 1C is a flowchart showing an operation of the ALM tree constructing apparatus 100 in FIG. 1B.

The ALM tree constructing apparatus 100 shown in FIG. 1B includes a metric measuring unit 110, a terminal allocating unit 120, a first communication path allocating unit 130, and a second communication path allocating unit 140. It is noted that the metric measuring unit 110, the terminal allocating unit 120, the first communication path allocating unit 130, and the second communication path allocating unit 140 respectively correspond to the metric measuring unit 101, the node allocating unit 202, the first branch allocating unit 203, and the second branch allocating unit 402 in FIG. 1A.

To measure an upload link bandwidth for each terminal, the metric measuring unit 110 transmits a measurement request to each terminal and receives the measurement result from each terminal (S10). Then, the metric measuring unit 110 notifies the terminal allocating unit 120 and the first communication path allocating unit 130 of the measurement result of the upload link bandwidth for each terminal.

The terminal allocating unit 120 allocates each terminal to a predetermined node in the ALM tree (S11). Then, the terminal allocating unit 120 transmits tree structure information on the result of the allocation to each terminal, and notifies the first communication path allocating unit 130 of the tree structure information. Although an approach to the allocation shall not be limited in particular, a desirable approach provides a terminal with a wider upload link bandwidth upstream, and a terminal with a narrower upload link bandwidth downstream according to the measurement result of the upload link bandwidth, for each terminal, obtained from the metric measuring unit 110. When each terminal is allocated with no consideration made for the width of the upload link band, however, the terminal allocating unit 120 does not have to obtain from the metric measuring unit 110 the measurement result of the upload link bandwidth.

The first communication path allocating unit 130 allocates to the lower terminal at least a part of the upload link bandwidth for each upper terminal, so that the allocated upload link bandwidth works as the first communication path (S12). Then the first communication path allocating unit 130 transmits to each terminal first communication path information on the allocation result, as well as notifies the second communication path allocating unit 140 of remaining bandwidth information indicating a remaining bandwidth of each terminal. The second communication path allocating unit 140 allocates a remaining bandwidth of a terminal in an upper layer to a terminal in a lower layer, so that the remaining bandwidth works as the second communication path (S13). Then the second communication path allocating unit 140 transmits to each terminal second communication path information on the allocation result.

Figure 2:
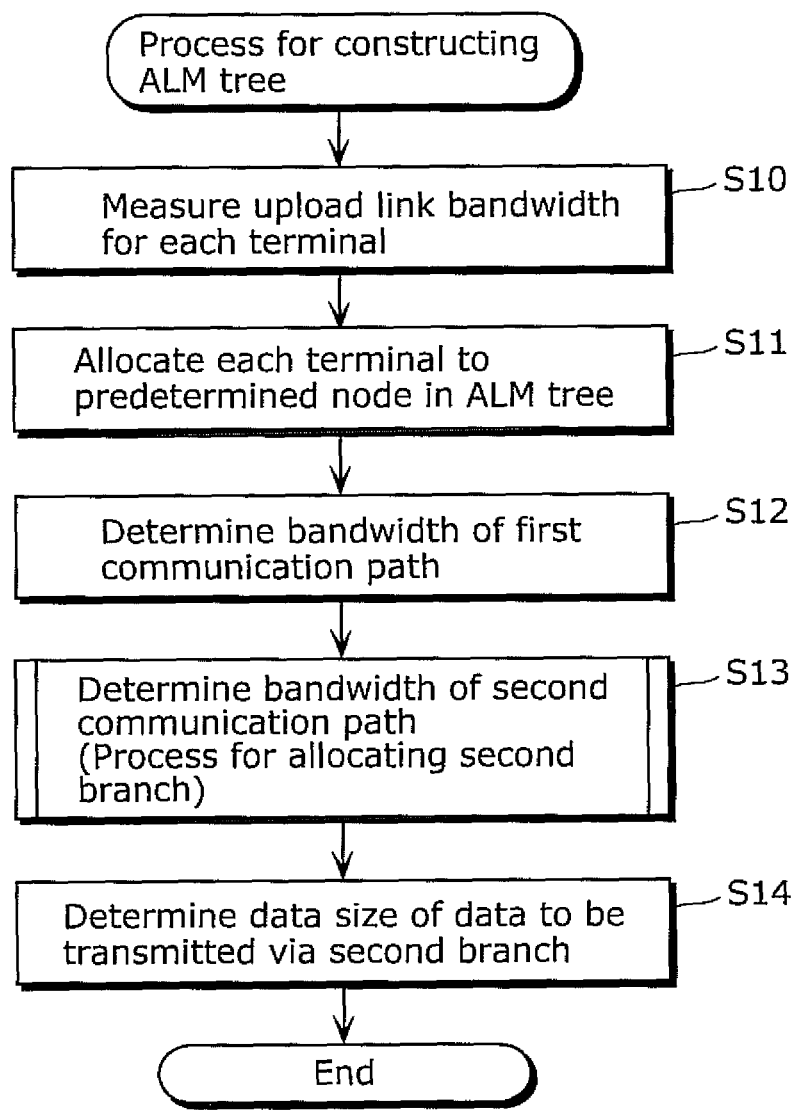
FIG. 2 is a flowchart showing a process for constructing an ALM tree.

Next, the operation of the ALM tree constructing apparatus 100 structured above shall be described with reference to FIGS. 2 to 9. FIG. 2 is a flowchart showing a process for constructing the ALM tree. It is noted that processing steps sharing the same numerical reference between FIGS. 1C and 2 involve the same process.

First, the metric measuring unit 101 measures uplink bandwidths for all of terminals 20 to 33 (S10). The measurement result of the upload link bandwidths is shown in ○ indicating terminals 20 to 33 in FIG. 4. It is noted that a concrete approach for measuring an uplink bandwidth shall not be specified in particular, and any conventional approach may be employed.

For example, the packet train approach can be employed to measure the uplink bandwidth. Specifically, the ALM tree constructing apparatus 100 transmits packets to the terminal 20; namely a measuring object, at predetermined intervals, and monitors reply packets from the terminal 20. As the ALM tree constructing apparatus 100 gradually shorten each transmission interval between the packets, the replay packets become delayed when the terminal uses up the upload link bandwidth. Based on the transmission interval and the data amount of the reply packets, the upload link bandwidth of the terminal 20 can be estimated. Upload link bandwidths of the other terminals 21 to 33 can be measured with a similar approach.

Figure 4:
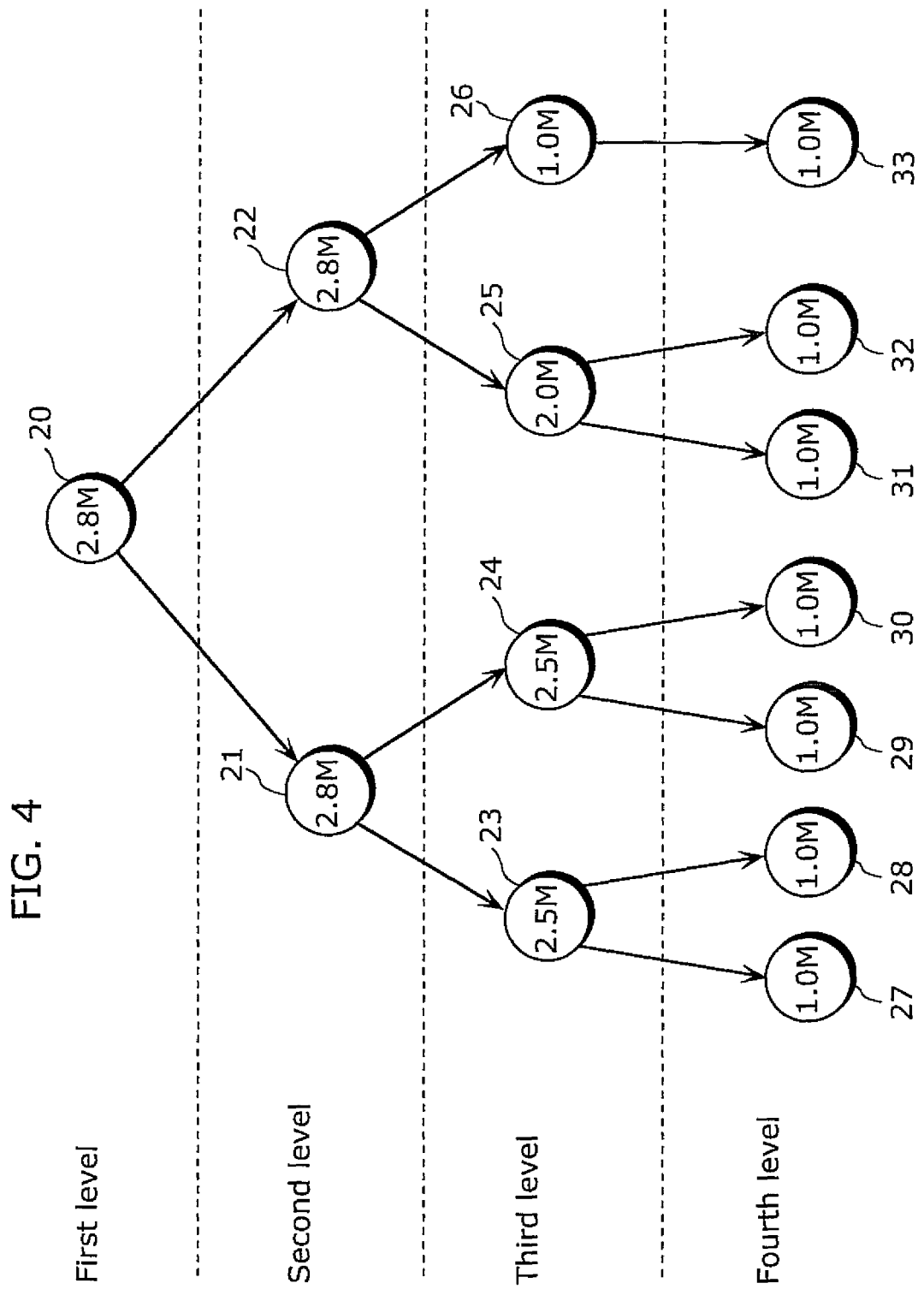
FIG. 4 shows terminals logically disposed on the ALM tree.

Next, the ALM tree constructing apparatus 100 executes a process to allocate terminals to predetermined nodes in the ALM tree (S11). FIG. 4 exemplifies a configuration of the ALM tree formed with fourteen terminals including the terminals 20 to 33. With reference to FIG. 4, a process in S11 shall be specifically described.

First, the node allocating unit 202 allocates the terminals 20 to 33 to any one of levels. In Embodiment 1, the terminals 20 to 33 are allocated to one of the first to fourth levels. The node allocating unit 202 allocates to the first level the terminal 20 acting as the distribution source of the data stream. Then the node allocating unit 202 allocates each of the terminals 21 to 33 to a higher level as its uplink bandwidth is wider. In FIG. 4, the terminals 21 and 22 are allocated to the second level, the terminals 23 to 26 are allocated to the third level, and the terminals 27 to 33 are allocated to the fourth level. It is noted that the allocation of the nodes (an approach to determine which node is allocated to which level) may not be limited to the descending order of the uplink bandwidth, and any conventional approach may be employed.

Next, the node allocating unit 202 allocates to each of the terminals 20 to 33 at least one of an upper terminal and a lower terminal. Specifically, the node allocating unit 202 allocates, to the terminal 20 in the first level, the terminals 21 and 22 in the second level as lower terminals. The node allocating unit 202 also allocates, to the terminal 21 in the second level, (i) the terminals 20 in the first level as an upper terminal, and (ii) the terminals 23 and 24 in the third level as lower terminals. Furthermore, the node allocating unit 202 allocates, to the terminal 27 in the fourth level, the terminals 23 in the third level as an upper terminal. The allocation of the other terminals is shown in FIG. 4, and thus the details thereof shall be omitted.

It is noted that the terminals 20 to 26 which have lower terminals are referred to as "non-leaf nodes". In particular, the terminal 20 which has lower terminals alone is referred to as the "root node". Concurrently, the terminals 27 to 33 which have upper terminals alone are referred to as "leaf nodes".

Figure 5:
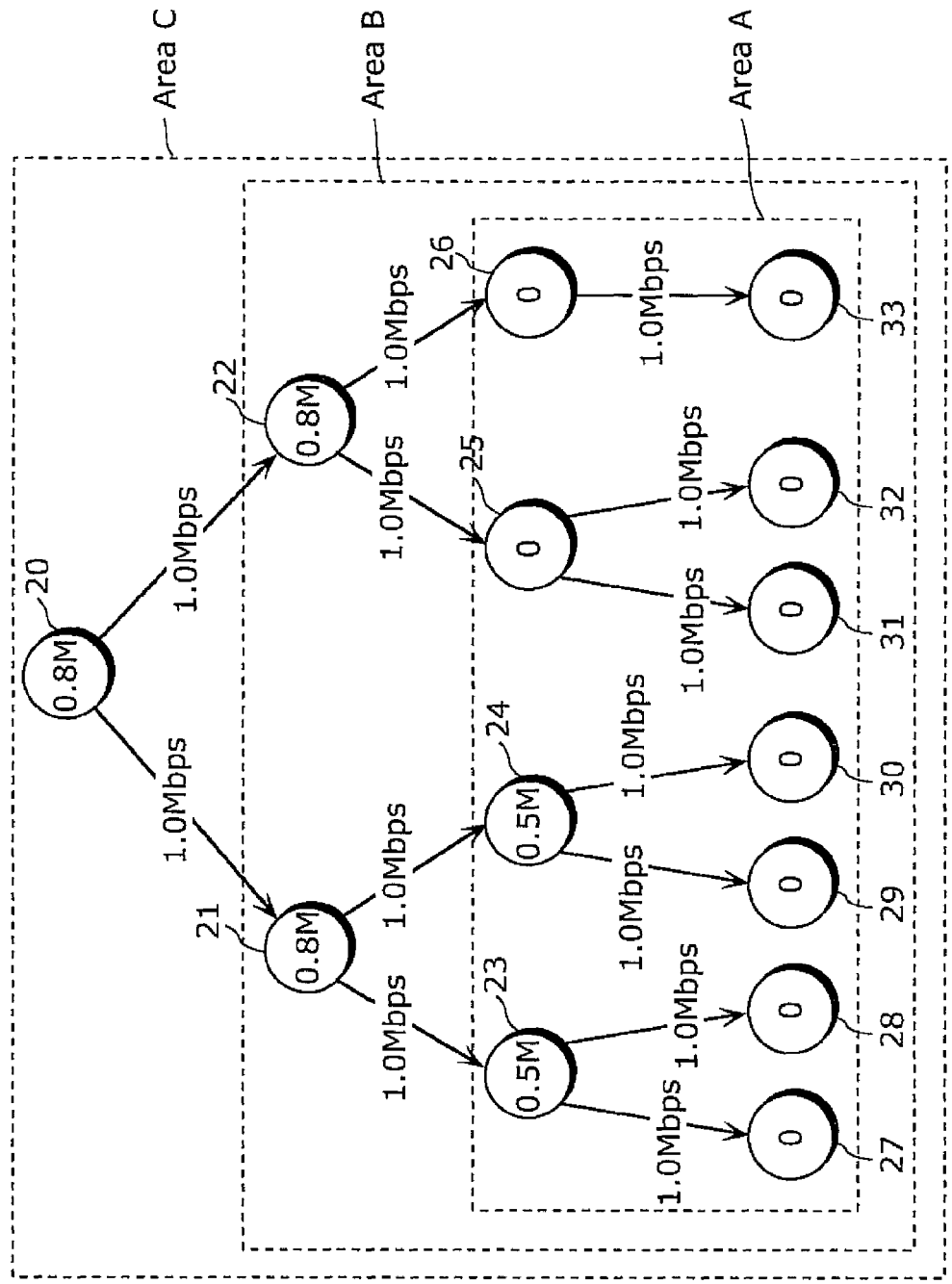
FIG. 5 shows that a bandwidth of first branches has been determined.

Next, the ALM tree constructing apparatus 100 determines a bandwidth of logical first branches used for distributing the data stream (S12). FIG. 5 shows a bandwidth of the first branches in the ALM tree in FIG. 4. With reference to FIG. 5, a process in S12 shall be specifically described.

First, for each of the non-leaf nodes, the first branch allocating unit 203 divides the uplink bandwidth by the number of lower terminals. For example, the terminal 20 has an uplink bandwidth of 2.8 Mbps with two lower terminals. Accordingly, the solution to the calculation is 1.4 Mbps. Similarly, the terminal 26 has an uplink bandwidth of 1.0 Mbps with one lower terminal. Thus the solution to the calculation is 1.0 Mbps.

The first branch allocating unit 203 executes the above calculations to all the non-leaf nodes, and identifies the minimum value of the calculation results as the bandwidth of the first branches. As shown in FIG. 5, 1.0 Mbps is the bandwidth of the first branches in Embodiment 1.

In addition, FIG. 5 shows remaining bandwidths of the terminals 20 to 26, or the non-leaf nodes (the values in ○ in FIG. 5 indicates the remaining bandwidths). Here, the remaining bandwidths for the terminals 20 to 26, or non-leaf nodes, can be calculated as "uplink bandwidth−the number of lower terminals×bandwidth of the first branch".

Specifically, the remaining bandwidths are calculated as follows: the terminals 20 to 22 have a remaining bandwidth of 0.8 Mbps (=2.8−2×1), the terminals 23 and 24 have a remaining bandwidth of 0.5 Mbps (=2.5−2×1), the terminal 25 has a remaining bandwidth of 0 Mbps (=2−1×2), and the terminal 26 has a remaining bandwidth of 0 Mbps (=1−1×1). The approach in the present invention utilizes the remaining bandwidths as the second branches in order to distribute additional data to a downstream node in the already-constructed ALM tree.

Figure 3:
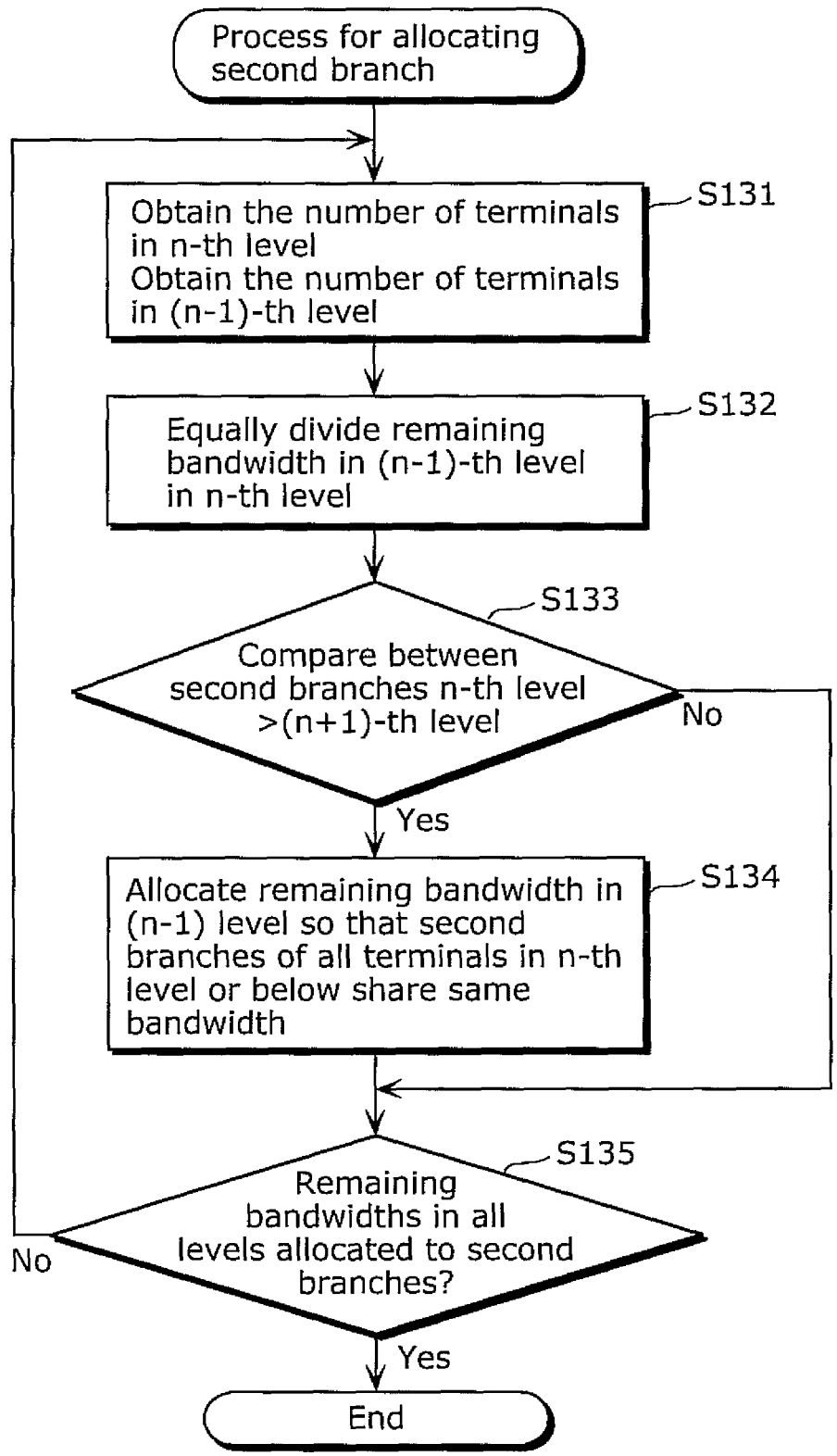
FIG. 3 is a flowchart showing a process for allocating second branches.

Next, the ALM tree constructing apparatus 100 allocates the second branches in order to determine a bandwidth of the second branches used for distribution of the additional data. FIG. 3 is a flowchart showing details of a process for allocating the second branches.

In any given ALM tree (a coverability tree), a downstream node receives and reproduces a data stream after an upstream node receives and reproduces the data stream. Thus consider the case where the additional data held in the upstream node is transmitted to the downstream node using the remaining bandwidth of the upstream node; the data stream is highly probably transmitted to the downstream node before its reproduction time.

Concurrently, consider the case of transmitting the additional data from the downstream node to the upstream node; the additional data would most likely be transmitted to the upstream node after its reproduction time. In this case, the additional data is not available. Accordingly, the remaining bandwidths cannot be efficiently utilized if employed is a simple approach that all of the remaining bandwidths in the ALM tree are summed and allocated to each receiving node.

Hence, in Embodiment 1, the remaining bandwidths are allocated, taking a configuration of the ALM tree, in particular the hierarchical relationship between the nodes, into consideration. Specifically, in principle, a remaining bandwidth of each node is used for the transmission of the additional data only to the downstream node of the node. It is noted that the "downstream node" is a node in a level lower than the level in which one node belongs. Similarly, the "upstream node" is a node in a level higher than the level in which one node belongs.

Figure 6:
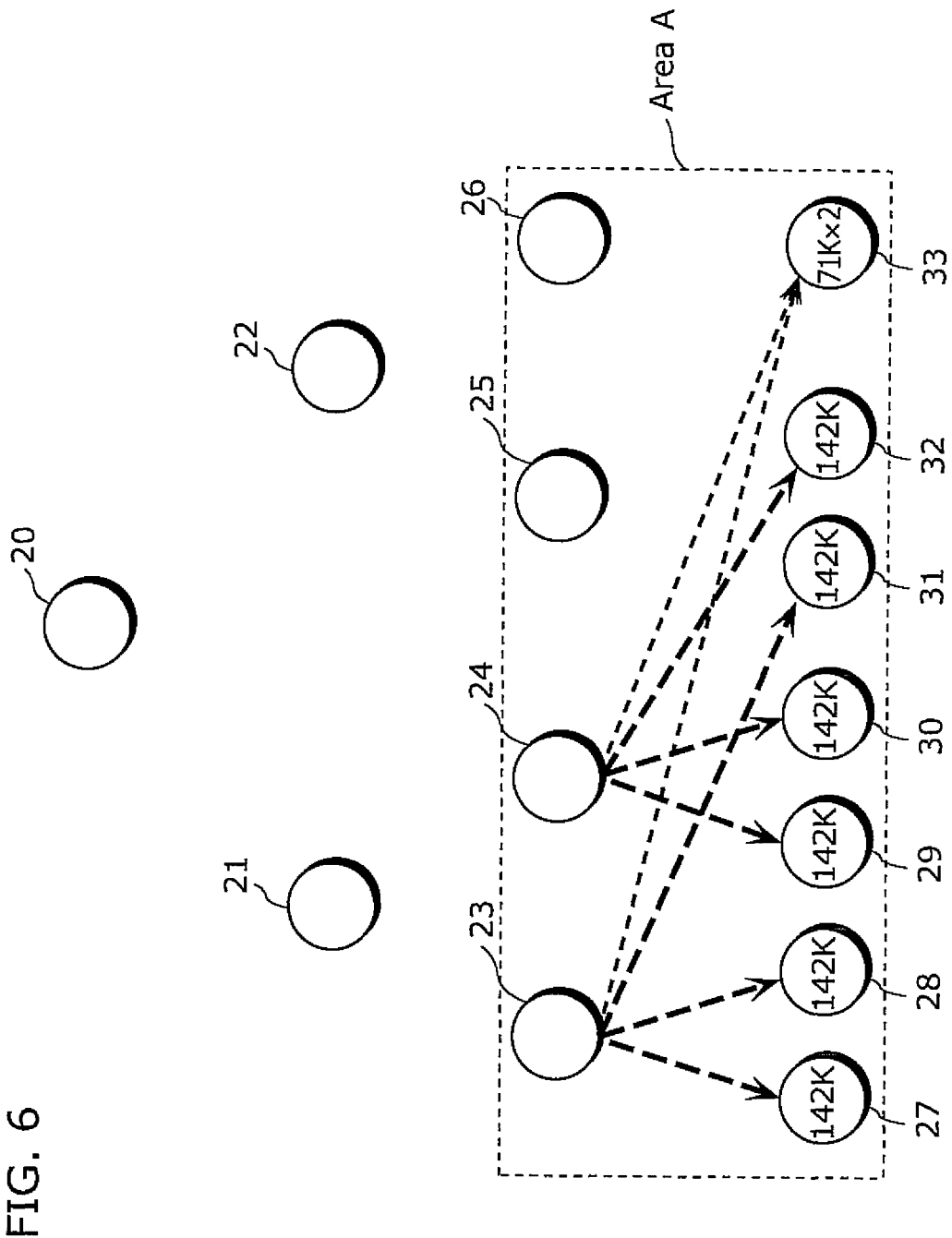
FIG. 6 shows that remaining bandwidths in a third level have been allocated as second branches in the fourth level.
Figure 8:
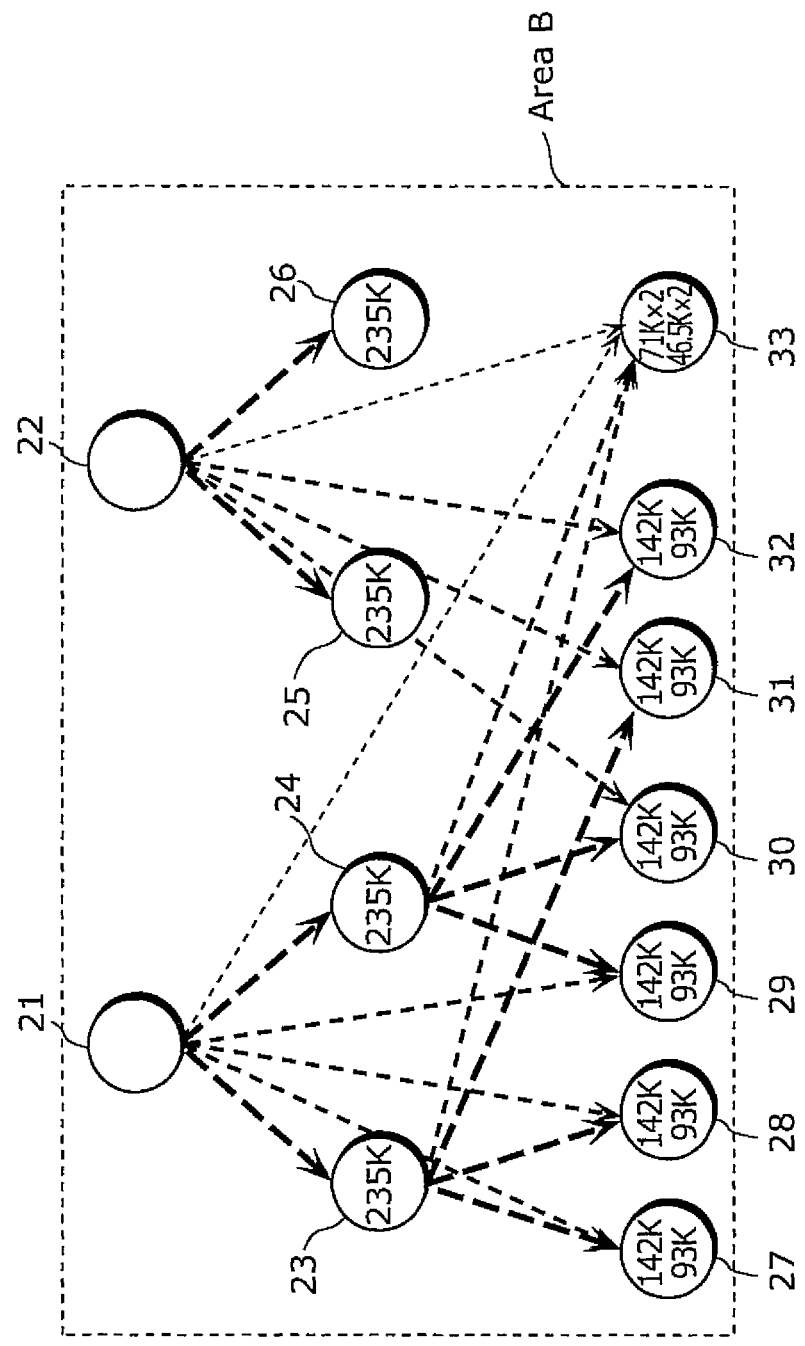
FIG. 8 shows that the remaining bandwidths in the second level have been allocated as the second branches in the third and fourth levels.

In FIG. 6, for example, the remaining bandwidths of all the nodes (the terminals 23 to 16) in the third level are utilized for transmission of the additional data to the nodes (the terminals 27 to 33) in the fourth level. In FIG. 8, the remaining bandwidths of both of the nodes (the terminals 21 and 22) in the second level are utilized for transmission of the additional data to the nodes (the terminals 23 to 33) in the third and fourth levels. Although not shown in the drawings, furthermore, the remaining bandwidth of the node (the terminal 20) in the first level is utilized for transmission of the additional data to the nodes (the terminals 21 to 33) in the second to fourth levels.

The remaining bandwidths are gradually allocated as described above using bottom-up calculation. FIG. 5 shows the concept of the bottom-up calculation. In other words, the second branches are allocated in the order of areas A, B, and C. Specifically, first, a calculation is carried out, and second branches are obtained. The second branches are made of the remaining bandwidths in the third level (hereinafter referred to as "Step 1"). Then, another calculation is carried out, and second branches are obtained. The second branches are made of the remaining bandwidths in the second level (hereinafter referred to as "Step 2"). Finally, another calculation is carried out, and second branches are obtained. The second branches are made of the remaining bandwidth of the first level (hereinafter referred to as "Step 3").

First, the second branch allocating unit 402 equally distributes the remaining bandwidths of all the terminals 23 to 26 in the third level among the terminals in the fourth level (Step 1). Specifically, first, the second branch allocating unit 402 obtains the number of terminals in the fourth level and the sum (hereinafter referred to as "total remaining bandwidth") of the remaining bandwidths of all the terminals 23 to 26 in the third level (S131).

Then the second branch allocating unit 402 equally divides (dividing into seven) the total remaining bandwidth of 1 Mbps (=0.5+0.5), and determines the bandwidth of the second branches to be allocated to the terminals 27 to 33 in the fourth level (S132). Here, 142 Kbps is the bandwidth of the second branches to be allocated to the terminals 27 to 33 in the fourth level.

Then, as shown in FIG. 6, the second branch allocating unit 402 allocates each remaining bandwidth of the terminals 23 and 24 in the third level to the terminals 27 to 33 in the fourth level, so that the allocated remaining bandwidths work as the second branches. Here, both of the remaining bandwidths of the terminals 23 and 24 are 500 Kbps. In other words, each of the terminals 23 and 24 can provide (i) three second branches each having a bandwidth of 142 Kbps, and (ii) one second branch having a bandwidth of 72 Kbps.

Hence, the second branch allocating unit 402 allocates from the terminal 23 to the terminals 27, 28, and 31 the second branches each having a bandwidth of 142 Kbps. Similarly, the second branch allocating unit 402 allocates from the terminal 24 to the terminals 29, 30, and 32 the second branches each having a bandwidth of 142 Kbps. Furthermore, the second branch allocating unit 402 allocates from each of the terminals 23 and 24 to the terminal 33 the second branches each having a bandwidth of 71 Kbps. Accordingly, the bandwidths allocated to the terminal 33 are 142 Kbps in total. As a result, each of terminals 27 to 33 in the fourth level has the second branch of the same bandwidth (142 Kbps).

Then the second branch allocating unit 402 compares (i) the bandwidth of each of the second branches to be allocated to a corresponding one of the terminals 27 to 33 in the fourth level with (ii) the bandwidth of each of the second branches to be allocated to terminals in a fifth level (S133). It is noted that in Embodiment 1, S134 is omitted since there is no fifth level (S133: No).

Next, the second branch allocating unit 402 determines whether or not the remaining bandwidths of all the levels have been allocated (S135) to the second branches. At this moment, not more than the remaining bandwidths of the third level are allocated (S135: No). Hence the second branch allocating unit 402 returns to S131, and continues the process.

Figure 7:
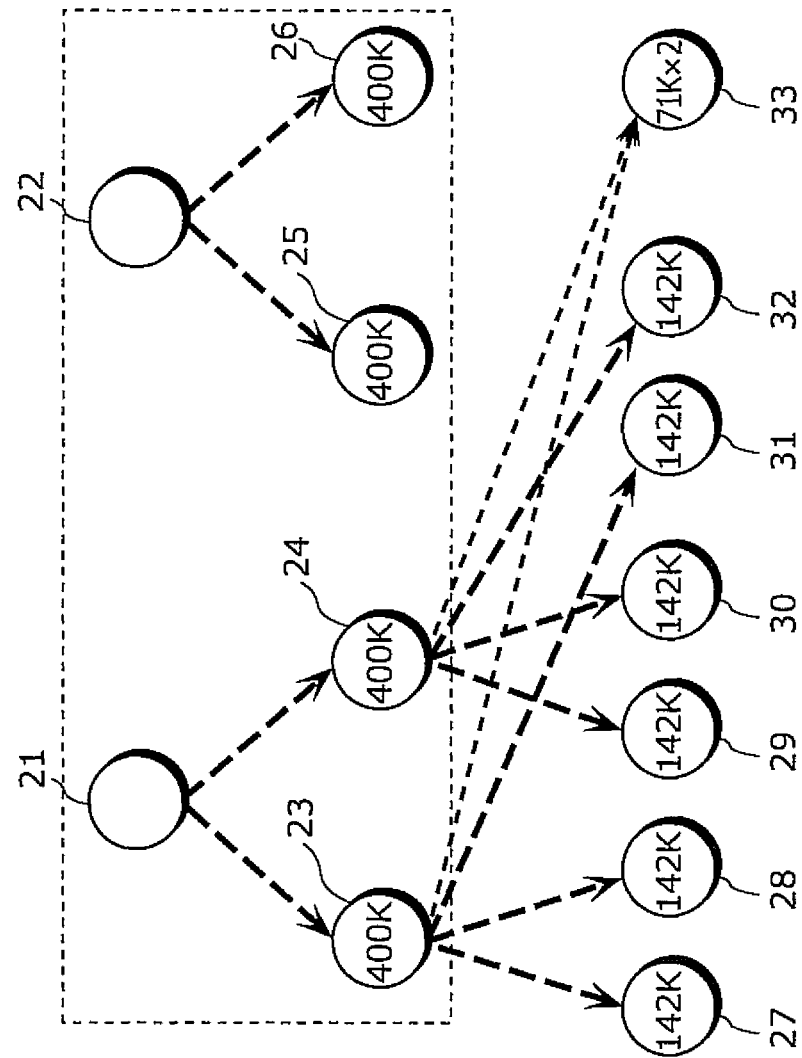
FIG. 7 shows that remaining bandwidths in a second level have been allocated as second branches in the third level.

Then the second branch allocating unit 402 obtains the number of the terminals (four) in the third level and the total remaining bandwidths (1.6 Mbps) in the second level (S131). Next, the second branch allocating unit 402 divides the total remaining bandwidths in the second level by the number of the terminals in the third level. As shown in FIG. 7, obtained is a bandwidth (400 Kbps) of the second branches alicatable to the terminals 23 to 26 in the third level (S132).

The allocating approach shown in FIG. 7 involves repeating the operation of Step 1 as it is. This approach is employed to equally allocate the total remaining bandwidths in the second level among the nodes in the level directly below. This approach carries an advantage of simplicity. In this approach, however, the bandwidths of the second branches differ in each level, leading to a disadvantage in that the streaming quality of the entire ALM tree does not improve. With the calculation result in Step 1 taken into consideration, an approach shown in FIG. 8 equalizes the bandwidths of the second branches in the entire ALM tree (Step 2).

Here, a comparison is made between (i) the bandwidth (400 Kbps) of the second branches allocatable to the terminals 23 to 26 in the third level and (ii) the bandwidth (142 Kbps) of the second branches which have been allocated already to the terminals 27 to 33 (S133).

Consider the case where the total remaining bandwidths in the i-th level are $X_i$ and the number of terminals in the i-th level is $Y_i$; when the relationship $(X_2/Y_3) \leq (X_3/Y_4)$ holds, the total remaining bandwidths $X_2$ in the second level are distributed only among the terminals 23 to 26 in the third level as described in S132. Concurrently, where the relationship $(X_2/Y_3) > (X_3/Y_4)$ holds, the total remaining bandwidths $X_2$ in the second level are equally distributed among the bandwidths of all the downstream nodes.

Since the bandwidth of the second branches allocatable to the third level is greater, (S133: Yes), the second branch allocating unit 402 allocates the total remaining bandwidths $X_2$ in the second level not only to the third level but also to the fourth level, so that the second branches to be allocated to the third and fourth levels share the same bandwidth (S134). For example, consider the case where X is the total remaining bandwidths of the i-th level, Y is the bandwidth of the second branches allocated at this moment to the terminals in the (i+2) level or below, and Z is the number of nodes in the (i+1) level; the following Expressions 1 and 2 are employed when the total remaining bandwidths X in the i-th level are allocated to all the levels including the (i+1) level or below:

The (i+1) level: Y+(X−Y×Z)/the number of downstream nodes  (Expression 1)

The (i+2) level or below: Y+(X−Y×Z)/the number of downstream nodes  (Expression 2)

The above distribution allows the total remaining bandwidths in the i-th level to be equally distributed among all the downstream nodes. Consider that the total remaining bandwidths X=1.6 Mbps in the second level, the bandwidth Y=142 Kbps of the second branches in the fourth level, the number of nodes Z=4 in the third level, and the number of downstream nodes=11 in the second level are substituted for Expressions 1 and 2; the bandwidth to be distributed to the third level is obtained as follows: 142 Kbps+(1.6 Mbps−4×142 Kbps)/11=235 Kbps, and the bandwidth to be distributed to the fourth level is obtained as follows: (1.6 Mbps−4×142 Kbps)/11=93 Kbps.

Since each of the nodes in the fourth level has already had the bandwidth of 142 Kbps (=Y), the bandwidth of 93 Kbps obtained through the above calculation is added to the already-had bandwidth. Accordingly, the total sum of the bandwidths in the second branches are 235 (=142 Kbps+93 Kbps).

Here, FIG. 8 specifically exemplifies how to allocate the second branches for the obtained bandwidths. The second branch allocating unit 402 allocates the remaining bandwidth of the terminal 21 to (i) the terminals 23 and 24 for 235 Kbps each, (ii) the terminals 27 to 29 for 93 Kbps each, and (iii) the terminal 33 for 46.5 Kbps. Similarly, the remaining bandwidth of the terminal 22 is allocated to (i) the terminals 25 and 26 for 235 Kbps each, (ii) the terminals 30 to 32 for 93 bps each, and (iii) the terminal 33 for 46.5 Kbps.

It is noted that the allocation of the second branches described here is merely one of examples. Any allocation may be allowed as far as the bandwidth of the second branches allocated to the terminals 23 to 33 is 235 kpbs.

Next, Step 3 is executed in a similar manner as Step 2. In other words, with the calculation result obtained in Step 2 (the bandwidth of the second branches obtained in Step 2) taken into consideration, the total remaining bandwidths in the first level (0.8 Mbps) are allocated. Specifically, X=0.8 Mbps, Y=235 Kbps, Z=2, and the number of downstream nodes in the first level=13 are substituted for the above Expressions.

As a result, the bandwidth of the second branches allocated to the second level is obtained as follows: 235 Kbps+(0.8 Mbps−2×235 Kbps)/13=260 Kbps, and the bandwidth of the second branches allocated to the third and fourth levels is obtained as follows: so (0.8 Mbps−2×235 Kbps)/13=25 Kbps.

It is noted here that the remaining bandwidths are distributed so that the bandwidth of the second branches allocated to the terminals is equal; however, this is merely one of examples. The remaining bandwidth may be allocated based on various principles. Setting an appropriate principle makes possible improving quality suitable to an application. For example, a group of specific nodes is selected, and the second branches are allocated from a node having a remaining bandwidth only to the node group. This can significantly improve the quality of a data stream to be distributed to the node group, which successfully introduces a node group acting as a backbone or a source of the ALM tree.

The above has described how to allocate the second branches, utilizing the remaining bandwidths (S10 to S13 in FIG. 2). Next, the ALM tree constructing apparatus 100 determines a data size of the data to be transmitted via the second branches allocated above (S14).

Any data may be transmitted as the data to be distributed, depending on an application. For example, the data may be an error-correcting code (a parity bit, for example) of the data stream transmitted via the first branches. Here the error-correcting code is calculated by the additional data calculating unit 601 shown in FIG. 1, and the details of the calculation shall be omitted.

Figure 9:
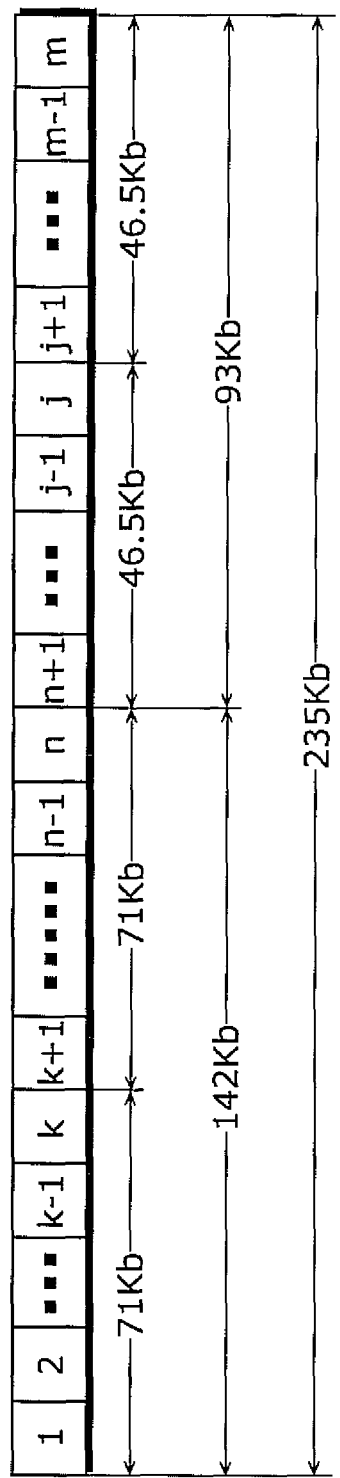
FIG. 9 shows additional data to be distributed via the second branches.

FIG. 9 shows packets to be distributed via the second branches. It is noted that described below is a procedure for transmitting the packets illustrated in FIG. 9 via the second branches having the bandwidths shown in FIG. 9.

First, each of the terminals 23 to 26 has one second branch of 235 Kbps in bandwidth. In other words, the terminals 23 to 26 receive all the packets numbered 1 to m from the terminals 21 and 22 via the second branches.

Concurrently, the terminals 27 to 33 have the second branches allocated. For example, the terminal 27 receives (i) one of the second branches of 142 Kbps in bandwidth from the terminal 23, and (ii) one of the second branches of 93 kpbs in bandwidth from the terminal 21. The terminal 33 receives (i) one each of the second branches (two second branches in total) of 72 Kbps in bandwidth from the terminals 23 and 24, and (ii) one each of the second branches (two second branches in total) of 46.5 Kbps in bandwidth from the terminals 21 and 22.

Among the packets numbered 1 to m to be distributed to the terminal 27, the ALM tree constructing apparatus 100 causes (i) the terminal 23 to distribute the packets numbered 1 to n (142/235), and (ii) the terminal 21 to distribute the packets numbered n+1 to m (93/235). The ALM tree constructing apparatus 100 employs a similar approach to divide the additional data and execute the distribution procedure of the additional data among the terminals 28 to 32.

Among the packets numbered 1 to m to be distributed to the terminal 33, the ALM tree constructing apparatus 100 employs an approach similar to the above to cause (i) the terminal 33 to distribute the packets numbered 1 to k (72/235), (ii) the terminal 24 to distribute the packets numbered k+1 to n (72/235), (iii) the terminal 21 to distribute the packets numbered n+1 to j (46.5/235), and (iv) the terminal 22 to distribute the packets numbered j+1 to m (46.5/235).

As described above, the terminals 27 to 33 could receive the second branches from two or more of the terminals. In this case, the additional data is proportionally divided by the bandwidths of the second branches and distributed to each of two or more terminals, so that the additional data can be distributed without delay.

In general, consider the case where a group of nodes N including h of any given nodes x; namely y1, y2, . . . , and yh, provides h of the second branches (I1, I2, . . . , and Ih), and the bandwidths of the second branches are respectively bw1, bw2, . . . , and bwh; the Expressions 3 and 4 calculate the ranges p1 and p2 (p1: upper limit, and p2: lower limit) of the sequence numbers of the data packets. Here, the data packets are distributed to x by each node yi (i=1, 2, . . . , and h) included in the node group N:

$$p1_i = pid2 + (pid1 - pid2) \times \frac{\sum_{j=1}^{i-1} bw_j}{\sum_{j=1}^{h} bw_j}$$ Expression 3

$$p2_i = p1_i + (pid1 - pid2) \times \frac{bw_i}{\sum_{j=1}^{h} bw_j}$$ Expression 4

It is noted that pid1 is a sequence number of the last packet of data, in a step, to be distributed via the second branches. Pid2 is a sequence number of the last packet of data, in a step before, to be distributed via the second branches. The above transmission allows all the terminals 23 to 33 to almost simultaneously receive the additional data of 235 Kbps.

Here, in the case where Forward Error Correction (FEC) data is desired to be transmitted so that the quality of the data stream to be distributed via the first branches improves, for example, the additional data calculating unit 601 executes a calculation to make the size of the FEC 235 Kbps. It is noted that transmission of FEC data is widely carried out in the streaming. Thus details of the FEC and a calculation technique of the FEC data out of the streaming data shall be omitted.

Exemplified here is the FEC data transmission as one of examples; concurrently, any given data may be transmitted via the second branches. For example, the second branches may be employed for sending retransmission data used for compensating the loss of a data stream to be distributed via the first branches. It is noted that the retransmission data is not always generated. In the case where the retransmission data is generated, omitted shall be a process (S14 FIG. 2) to determine the data size of the data to be distributed via the second branches.

With reference to FIG. 8, a procedure detailed below shows how the terminal 30 uses the second branches to receive the retransmission data. First, the terminal 30 uses the first branches to check whether or not no packet loss is found in the data stream received from the terminal 24. A specific approach to detect a packet loss shall not be limited in particular. For example, the packet loss may be detected with reference to the sequence number of a real-time transport protocol (RTP) header.

When detecting the packet loss, the terminal 30 requests either the terminal 24 or 25 connected via the second branches to retransmit the lost packet. Hence the terminal 30 can receive the retransmission packet from the terminal 24 via the second branches.

It is noted that an approach to select a terminal requesting the retransmission shall not be limited in particular. For example, the selected terminal may have the greatest bandwidth for the second branches (here, the terminal 24). Based on the second communication path information obtained from the ALM tree constructing apparatus 100, the terminal 30 is assumed to know (i) the bandwidth (142 Kbps) of the second branches provided from the terminal 24, and (ii) the bandwidth (93 Kbps) of the second branches provided from the terminal 25.

Embodiment 2

Next, the Embodiment 2 of the present invention shall be described with reference to FIG. 10. It is noted that the basic structure detailed in Embodiment 1 is the same as that of the ALM tree constructing apparatus 100 in FIG. 1. The principle employed in Embodiment 1 utilizes the remaining bandwidth of any given node in the ALM tree as the second branches allocated to the downstream nodes. In reality, however, delay times observed at all the nodes in a single level are not equal. Accordingly, the hierarchical relationship between the nodes does not necessarily follow the configuration of the ALM tree in view of a delay time observed from the root node. Hence Embodiment 2 differs from Embodiment 1 in that Embodiment 2 shows allocation of the second branches based on a delay time from the root node, irrespective of the levels in the ALM tree.

Figure 10:
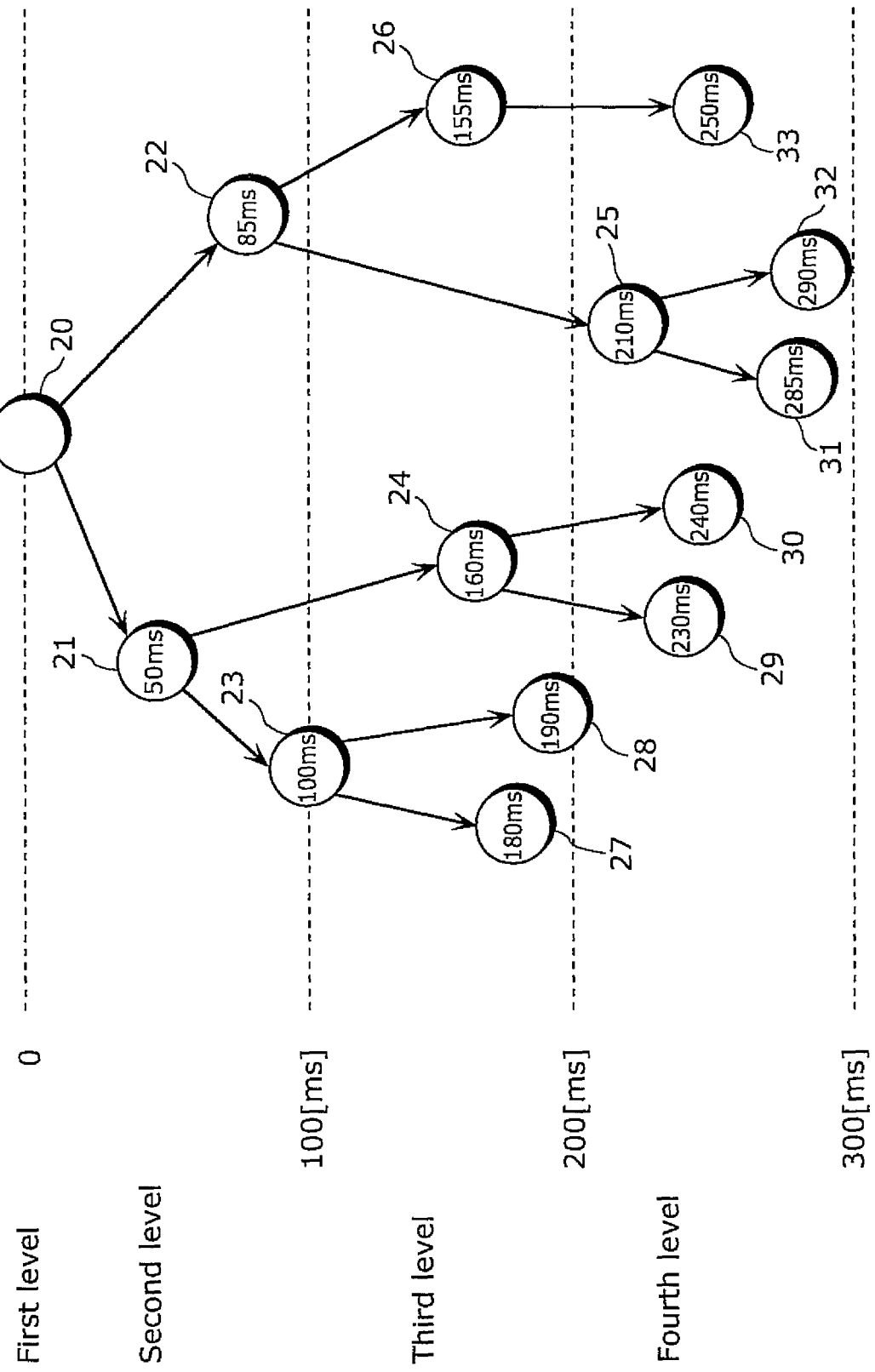
FIG. 10 shows a hierarchical structure with a transmission path delay taken into consideration.

FIG. 10 shows delay times, of the data stream to be distributed from the terminal 20, observed at the terminals 21 to 33. FIG. 10 also illustrates equal delay lines showing delay times of 100 [ms], 200 [ms], and 300 [ms] from the terminal 20. Delays from the terminal 20 to each of the terminals 21 to 33 are illustrated in distances from the terminal 20.

It is noted that a specific example of a delay-time measurement approach shall not be limited in particular. For example, the real-time transport control protocol (RTCP) may be employed for the measurement. Specifically, the terminal 20 working as the ALM tree constructing apparatus 100 transmits a packet to the terminal 21 at which a delay time is to be measured, and measures a time to receive a reply packet from the terminal 21 as the delay time. Delay times at the other terminals 21 to 33 can be measured with a similar approach.

Since the delay times from the terminal 20 to the terminals 21 to 33 in each level (the second to fourth levels) are not equal as shown in FIG. 10, the hierarchical relationship between the nodes in view of the delay from the terminal 20 differs from the hierarchical relationship in view of the configuration of the ALM tree. In view of the configuration of the ALM tree, specifically, the terminals 27 and 28 shown in FIG. 10 belong to the third level, and the terminal 25 belongs to the second level. However, the delay times from the terminal 20 to the terminals 27 and 28 are shorter than that to the terminal 25. In other words, in view of the delay from the terminal 20, the hierarchical relationship is inverted.

As described above, the approach described in Embodiment 1 could allocate remaining bandwidths, and transmit additional data in an ALM tree having inconsistent hierarchical relationship. The transmitted additional data, however, is highly likely to be late for a reproduction time, and thus be unavailable. In order to cope with the above environment, the basic approach described in Embodiment 1 shall be extended as described below.

When using a remaining bandwidth of any given node as a second branch, the approach to allocate the second branch in Embodiment 2 employs, as a node to have the remaining bandwidth, only a node having a longer delay time than a delay time of the node providing the remaining bandwidth. Accordingly, the approach does not take the configuration of the ALM tree into consideration.

As shown in FIG. 10, first, the transmission path delay measuring unit 501 measures delay times at the terminals 21 to 33. Then, based on the measurement result, the transmission path delay applying unit 403 allocates (i) to the second level the terminals 21 to 23 having a delay time of 100 ms or shorter, (ii) to the third level the terminals 24, and 26 to 28 having a delay time of 100 ms through 200 ms, and (iii) to the fourth level the terminals 25 and 29 to 33 having a delay time of 200 ms through 300 ms.

Hence, based on the levels determined above, the second branch allocating unit 402 executes a process similar to Steps 1 to 3. Details of the process have been described before, and shall be omitted.

Embodiment 3

Instead of being introduced as the ALM tree constructing apparatus and the ALM tree constructing method according to Embodiment 1, the present invention may be introduced in a form of a program for causing a computer to execute the ALM tree constructing methods according to Embodiments 1 and 2.

Figure 11A:
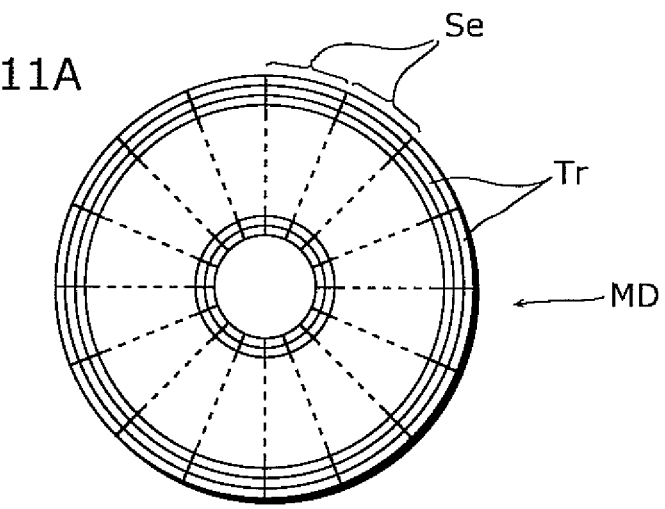
FIG. 11A shows a physical format of a magnetic disk used as a storage medium body.
Figure 11B:
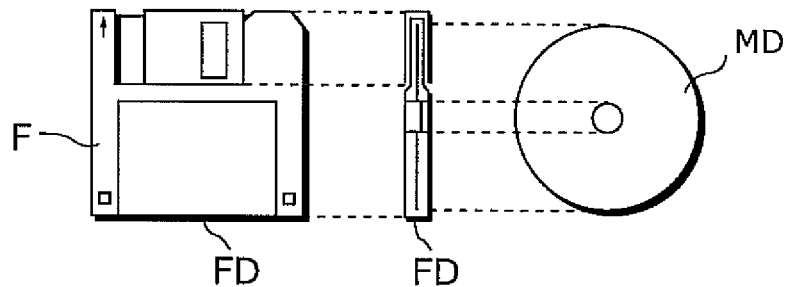
FIG. 11B shows the magnetic disk, and an elevated view and a cross-sectional view of a casing holding the magnetic disk.
Figure 11C:
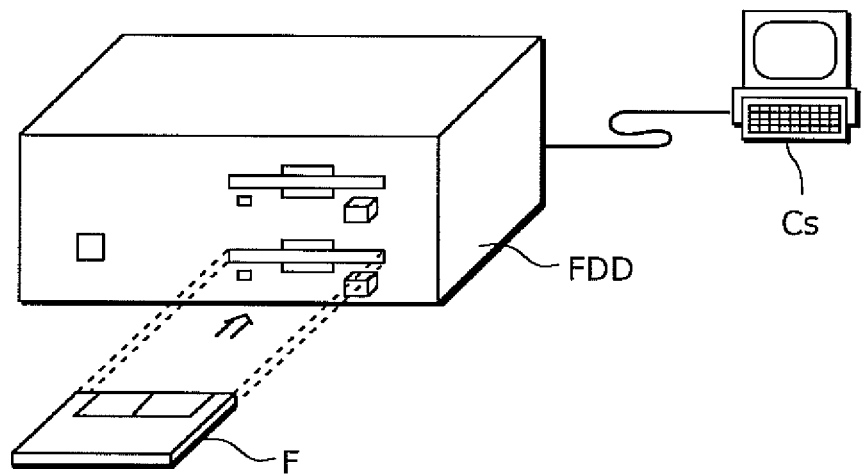
FIG. 11C shows how a program is stored on a flexible disk and is reproduced.
Figure 12:
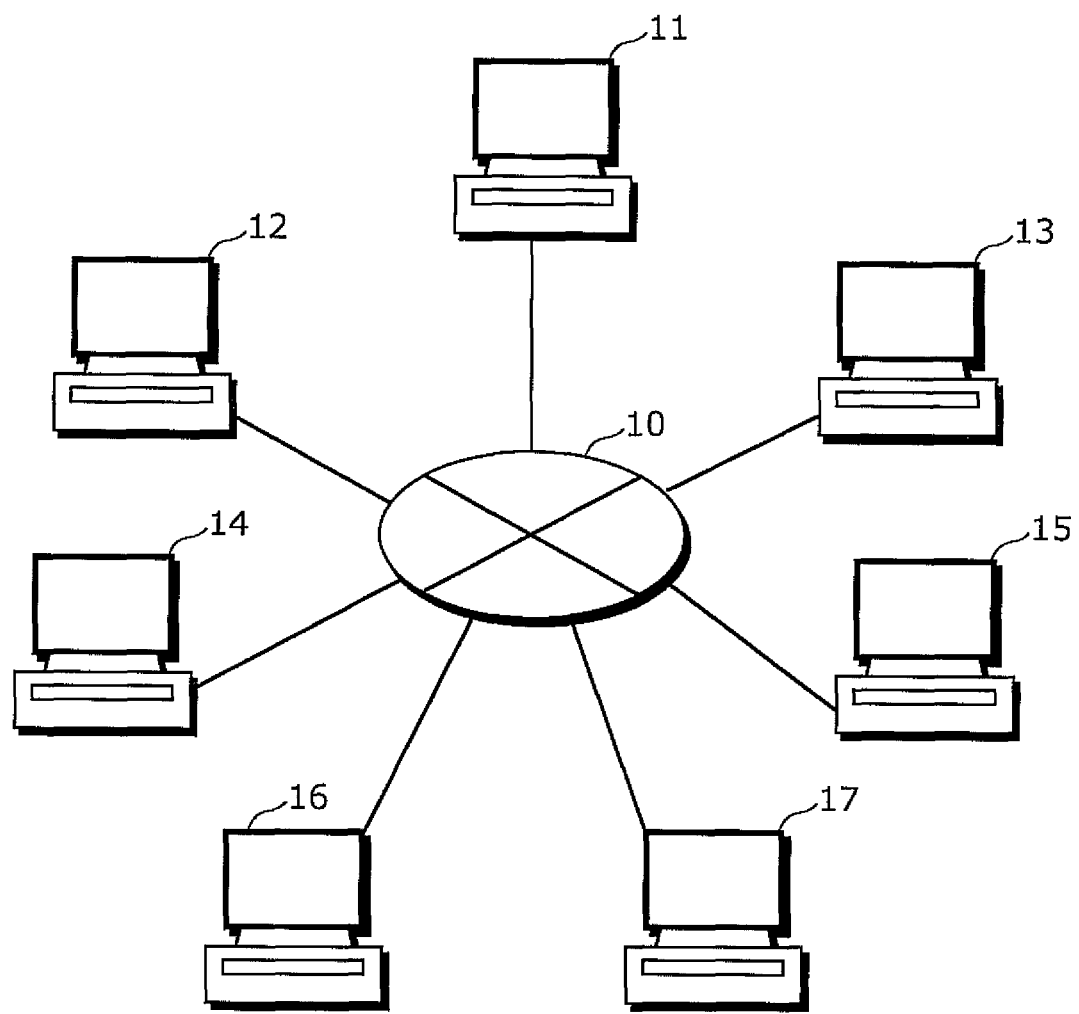
FIG. 12 shows a conventional network configuration.
Figure 13:
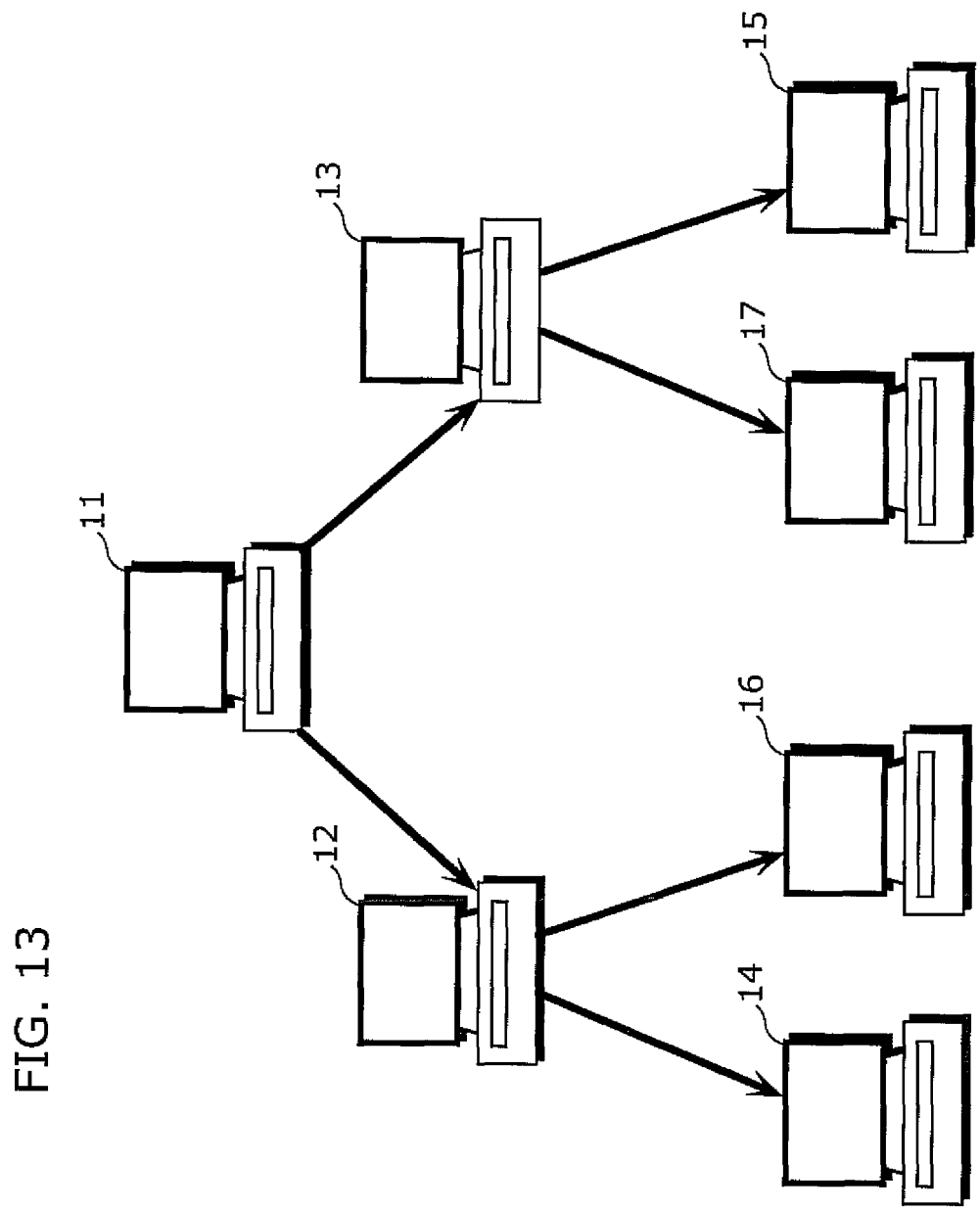
FIG. 13 exemplifies an ALM tree formed with the terminals shown in FIG. 12.

FIGS. 11A to 11C show how a computer system executes the ALM tree constructing methods according to Embodiments 1 and 2 using a flexible disk floppy disk (FD) which stores the methods.

FIG. 11A shows a physical format of a magnetic disk; namely, a storage medium body. FIG. 11B shows a magnetic disk MD, and an elevated view and a cross-sectional view of a casing F holding the magnetic disk MD. FIG. 11C shows how the program is stored on the flexible disk FD, and is reproduced.

The flexible disk FD includes the magnetic disk MD; namely a storage medium body, and the casing F holding the magnetic disk MD. The surface of the magnetic disk MD has tracks Tr concentrically formed from the outer periphery to the inner periphery. The tracks Tr are circumferentially divided into 16 sectors Se. Hence the flexible disk FD with the above program stores, in an area assigned on the magnetic disk MD, the ALM tree constructing method in a form of the above program.

When the above program is to be stored in the flexible disk FD, the ALM tree constructing method in a form of the above program is provided from a computer system Cs and written on the flexible disk FD via a flexible disk drive FDD. When the ALM tree constructing method is to be constructed in the computer system Cs using the program in the flexible disk FD, the flexible disk drive FDD reads the program from the flexible disk FD, and transfers the read program to the computer system Cs.

It is noted that, in the above description, the flexible disk FD is used as a storage medium; concurrently, an optical disk may also be used. In addition, a flexible disk and an optical disk shall not be limited as a storage medium; instead, any given program-storable medium, such as an integrated circuit (IC) card and a read-only memory (ROM) cartridge, may be used.

Furthermore, the present invention may have some or all of the constituent features of the ALM tree constructing apparatus integrated into one single system large scale integration (LSI). A system LSI is an ultra-multifunctional LSI having constituent units integrated on one single chip.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

Since offering greater quality of service (QoS), the present invention is useful for video distribution and a distance lecture utilizing the ALM technique.

REFERENCE SIGNS LIST

10 Communication network
11 to 17 and 20 to 33 Terminal
100 ALM tree constructing apparatus
101 and 110 Metric measuring unit
120 Terminal allocating unit
130 First communication path allocating unit
140 Second communication path allocating unit
201 ALM tree calculating unit
202 Node allocating unit
203 First branch allocating unit
301 ALM control unit
401 Second branch calculating unit
402 Second branch allocating unit
403 Transmission path delay applying unit
404 Additional data allocating unit
501 Transmission path delay measuring unit
601 Additional data calculating unit

The invention claimed is:

1. An Application Layer Multicast (ALM) tree constructing apparatus which constructs an ALM tree for distributing a data stream from a root terminal, which is selected from among terminals, to all the other terminals, the terminals being mutually connected via a communication network, and the ALM tree constructing apparatus comprising:

a metric measuring unit configured to measure an upload link bandwidth for each of the terminals;

a terminal allocating unit configured to allocate, to each of the terminals, at least one of (i) an upper terminal acting as a distribution source of the data stream and (ii) one or more lower terminals acting as destinations of the data stream;

a first communication path allocating unit configured to allocate at least a part of the upload link bandwidth which is (i) assigned to each of the terminals that has the lower terminal allocated, and (ii) measured by the metric measuring unit, so that the part of upload link bandwidth acts as a logical first communication path for distributing the data stream to the lower terminal;

for each of terminals having a remaining bandwidth which is included in the upload link bandwidth and is unused as the logical first communication path, a second communication path allocating unit configured to allocate the remaining bandwidth to one of the terminals which is provided in a hierarchy level below the terminal having the remaining bandwidth, so that the remaining bandwidth acts as a logical second communication path for distributing reference data regarding the data stream; and a transmission path delay measuring unit configured to measure, for each of all the other terminals, a delay time observed on the logical first communication path until each other terminal receives the data stream distributed from the root terminal, wherein the second communication allocating unit is configured to allocate, as the logical second communication path, the remaining bandwidth to another one of the terminals having a longer delay time than the one terminal.

2. The ALM tree constructing apparatus according to claim 1, wherein the terminal allocating unit is configured to allocate each of the terminals to one of a first level, a second level, and a third level, the terminals allocated to the second level having one of the terminals allocated to the first level as the upper terminal, and the terminals allocated to the third level having one of the terminals allocated to the second level as the upper terminal, and the second communication path allocating unit is configured to equally allocate, as the logical second communication path, (i) a remaining bandwidth of each of the terminals in the second level to each of the terminals in the third level, and (ii) a remaining bandwidth of each of the terminals in the first level to each of the terminals in the second level.

3. The ALM tree constructing apparatus according to claim 2, wherein n the case where a first quotient when the remaining bandwidth of the terminal in the first level is divided by the number of the terminals in the second level is greater than a second quotient when the remaining bandwidth of the terminal in the second level is divided by the number of the terminals in the third level, the second communication path allocating unit is configured to allocate the remaining bandwidth of the terminal in the first level among the terminals in the second level and the third level, so that the logical second communication paths provided to the terminals in the second level and the third level share a same bandwidth.

4. The ALM tree constructing apparatus according to claim 1, further comprising:

a transmission path delay measuring unit configured to measure, for each of all the other terminals, a delay time observed until each other terminal receives the data stream distributed from the root terminal; and a transmission path delay applying unit configured to allocate, based on a measurement result obtained from the transmission path delay measuring unit, each of the terminals to one of a first level, a second level, and a third level each receiving the data stream distributed from the root terminal, the first level receiving the data stream on or before a first time, the second level receiving the data stream after the first time and on or before a second time coming after the first time, and the third level receiving the data stream after the second time, wherein the second communication path allocating unit is configured to equally allocate, as the logical second communication path, (i) a remaining bandwidth of each of terminals in the second level to each of terminals in the third level, and (ii) a remaining bandwidth of each of terminals in the first level to each of the terminals in the second level.

5. The ALM tree constructing apparatus according to claim 1, further comprising a reference data allocating unit configured, when the remaining bandwidth of each of two or more of the terminals is allocated to a single terminal included in the terminals so that the remaining bandwidths act as the logical second communication paths, to proportionally divide the reference data by the bandwidths of the logical second communication paths, and to cause each of the two or more of the terminals to distribute the divided reference data.

6. The ALM tree constructing apparatus according to claim 1, wherein the reference data includes an error-correcting code for the data stream.

7. The ALM tree constructing apparatus according to claim 1, wherein the reference data includes retransmission data for compensating a loss of the data stream.

8. The ALM tree constructing apparatus according to claim 1, wherein the ALM tree constructing apparatus is the root terminal.

9. The ALM tree constructing apparatus according to claim 1, wherein each of the terminals has an upload link bandwidth and a download link bandwidth assigned, and the first communication path allocating unit is configured to allocate by adding, for the terminals each of which has the lower terminal assigned, at least a portion of the upload link bandwidth, as the first communication path, to the download link bandwidth, the upload link bandwidth being measured by the metric measuring unit.

10. A method for constructing an ALM tree which distributes a data stream from a root terminal, which is selected from among terminals, to all the other terminals, the terminals being mutually connected via a communication network, and the method comprising:

measuring an upload link bandwidth for each of the terminals;

allocating, to each of the terminal, at least one of (i) an upper terminal acting as a distribution source of the data stream and (ii) one or more lower terminals acting as destinations of the data stream;

allocating at least a part of the upload link bandwidth which is (i) assigned to each of the terminals that has the lower terminal allocated, and (ii) measured in the measuring, so that the part of upload link bandwidth acts as a logical first communication path for distributing the data stream to the lower terminal; and for each of terminals having a remaining bandwidth which is included in the upload link bandwidth and is unused as the first communication path, allocating the remaining bandwidth to one of the terminals which is provided in a hierarchy level below the terminal having the remaining bandwidth on the logical first communication path, so that the remaining bandwidth acts as a logical second communication path for delivering reference data regarding the data stream; and measuring, for each of all the other terminals, a delay time observed on the logical first communication path until each other terminal receives the data stream distributed from the root terminal, wherein the allocating as the logical second communication path allocates the remaining bandwidth to another one of the terminals having a longer delay time than the one terminal.

11. A non-transitory computer-readable recording medium for use in a computer, the recording medium having a computer program (i) used for constructing an ALM tree which distributes a data stream from a root terminal, which is selected from among terminals, to all the other terminals, the terminals being mutually connected via a communication network, and (ii) recorded thereon for causing the computer to execute:

measuring an upload link bandwidth for each of the terminals;

allocating, to each of the terminal, at least one of (i) an upper terminal acting as a distribution source of the data stream and (ii) one or more lower terminals acting as destinations of the data stream;

allocating at least a part of the upload link bandwidth which is (i) assigned to each of the terminals that has the lower terminal allocated, and (ii) measured in the measuring, so that the part of upload link bandwidth acts as a logical first communication path for distributing the data stream to the lower terminal; and for each of terminals having a remaining bandwidth which is included in the upload link bandwidth and is unused as the first communication path, allocating the remaining bandwidth to one of the terminals which is provided in a hierarchy level below the terminal having the remaining bandwidth on the logical first communication path, so that the remaining bandwidth acts as a logical second communication path for delivering reference data regarding the data stream; and measuring, for each of all the other terminals, a delay time observed on the logical first communication path until each other terminal receives the data stream distributed from the root terminal, wherein the allocating as the logical second communication path allocates the remaining bandwidth to another one of the terminals having a longer delay time than the one terminal.

12. An integrated circuit which constructs an ALM tree which distributes a data stream from a root terminal, which is selected from among terminals, to all the other terminals, the terminals being mutually connected via a communication network, and the integrated circuit comprising:

a metric measuring unit configured to measure an upload link bandwidth for each of the terminals;

a terminal allocating unit configured to allocate to each of the terminal at least one of (i) an upper terminal and (ii) one or more lower terminals, the upper terminal acting as a distribution source of the data stream, and the lower terminals acting as a destination of the data stream;

a first communication path allocating unit configured to allocate at least a part of the upload link bandwidth which is (i) assigned to each of the terminals that has the lower terminal allocated, and (ii) measured by the metric measuring unit, so that the part of upload link bandwidth acts as a logical first communication path for distributing the data stream to the lower terminal; and for each of terminals having a remaining bandwidth which is included in the upload link bandwidth and is unused as the first communication path, a second branch allocating unit configured to allocate the remaining bandwidth to one of the terminals which is provided in a hierarchy below the terminal having the remaining bandwidth on the logical first communication path, so that the remaining bandwidth acts as a logical second communication path for delivering reference data regarding the data stream; and a transmission path delay measuring unit configured to measure, for each of all the other terminals, a delay time observed on the logical first communication path until each other terminal receives the data stream distributed from the root terminal, wherein the second communication allocating unit is configured to allocate, as the logical second communication path, the remaining bandwidth to another one of the terminals having a longer delay time than the one terminal.

* * * * *